United States Patent
Giri

(10) Patent No.: US 10,745,613 B2
(45) Date of Patent: Aug. 18, 2020

(54) NEAR-IR ABSORPTIVE COMPOUNDS AND DEVICES INCORPORATING THE SAME

(71) Applicant: Gentex Corporation, Zeeland, MI (US)

(72) Inventor: Punam Giri, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 314 days.

(21) Appl. No.: 15/786,167

(22) Filed: Oct. 17, 2017

(65) Prior Publication Data

US 2018/0105738 A1    Apr. 19, 2018

Related U.S. Application Data

(60) Provisional application No. 62/409,034, filed on Oct. 17, 2016.

(51) Int. Cl.
*C09K 9/02* (2006.01)
*G02F 1/15* (2019.01)
*G02F 1/1503* (2019.01)

(52) U.S. Cl.
CPC .............. *C09K 9/02* (2013.01); *G02F 1/15* (2013.01); *G02F 1/1503* (2019.01); *C09K 2211/1051* (2013.01); *G02F 2203/11* (2013.01)

(58) Field of Classification Search
CPC ..... C09K 9/02; C09K 2211/1051; G02F 1/15; G02F 1/1521; G02F 2203/11
See application file for complete search history.

(56) References Cited

U.S. PATENT DOCUMENTS 4,297,401 A   10/1981 Chern et al.
4,418,102 A   11/1983 Ferrato
(Continued)

FOREIGN PATENT DOCUMENTS

JP    2005-517978 A     6/2005
WO    WO-2015/183821 A1 12/2015
WO    WO-2016/145120 A1  9/2016

OTHER PUBLICATIONS

Database Regestry [online] RN 1835339-58-6, Dec. 22, 2015, Retrieved from STN.
(Continued)

*Primary Examiner* — Brian Ahvazi
(74) *Attorney, Agent, or Firm* — Foley & Lardner LLP; Bradley D. Johnson

(57) ABSTRACT

An electrochromic device includes a compound of Formula (I):

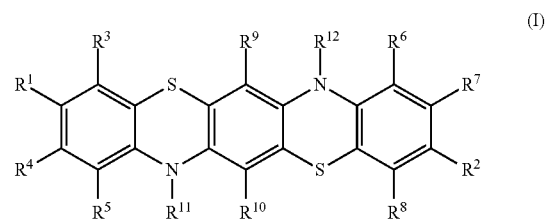

wherein: $R^1$ and $R^2$ are individually alkyl, alkoxy, or aryloxy; $R^3$, $R^4$, $R^5$, $R^6$, $R^7$, $R^8$ are individually H, alkoxy, or aryloxy; $R^9$ and $R^{10}$ are individually alkoxy, or aryloxy, or where $R^1$ and $R^2$ are alkyl, $R^9$ and $R^{10}$ are individually H, alkoxy, or aryloxy; and $R^{11}$ and $R^{12}$ are individually alkyl or —$(CH_2)_n N^+(R^{20})_3$ [X], wherein n is from 1 to 20; each $R^{20}$ is individually alkyl; and X is an anion.

7 Claims, 15 Drawing Sheets

(56) References Cited

U.S. PATENT DOCUMENTS

| | | | |
|---|---|---|---|
| 4,695,490 | A | 9/1987 | McClelland et al. |
| 4,902,108 | A | 2/1990 | Byker |
| 5,596,023 | A | 1/1997 | Tsubota et al. |
| 5,596,024 | A | 1/1997 | Horie et al. |
| 5,818,625 | A | 10/1998 | Forgette et al. |
| 6,157,480 | A | 12/2000 | Anderson et al. |
| 6,188,505 | B1 | 2/2001 | Lomprey et al. |
| 6,445,486 | B1 | 9/2002 | Lomprey et al. |
| 6,597,489 | B1 | 7/2003 | Guarr et al. |
| 6,700,692 | B2 | 3/2004 | Tonar et al. |
| 6,710,906 | B2 | 3/2004 | Guarr et al. |
| 6,714,334 | B2 | 3/2004 | Tonar |
| 7,372,611 | B2 | 5/2008 | Tonar et al. |
| 7,428,091 | B2 | 9/2008 | Baumann et al. |
| 8,274,729 | B2 | 9/2012 | Luten et al. |
| 2002/0141032 | A1* | 10/2002 | Guarr ............... C09K 9/00 359/265 |

OTHER PUBLICATIONS

Database Regestry [online] RN 1835339-79-1, Dec. 22, 2015, Retrieved from STN.

International Search Report and Written Opinion in International Application No. PCT/US2017/057001 dated Feb. 28, 2017 (7 pages).

Reasons for Refusal issued on JP 2019-542347 dated Apr. 20, 2020, 7 pages, with English translation.

* cited by examiner (a) (b) (c)

Less than 1 min to switch

NEAR-IR ABSORPTIVE COMPOUNDS AND DEVICES INCORPORATING THE SAME

CROSS-REFERENCE TO RELATED APPLICATIONS

This application claims the benefit of U.S. Provisional Patent Application No. 62/409,034, filed on Oct. 17, 2016, the entire disclosure of which is incorporated herein by reference for any and all purposes.

FIELD

The present technology is generally related to electrochromic compounds and electro-optic devices. More particularly, it is related to triphenodithiazines and their use in electrochromic devices that incorporate them.

SUMMARY

In one aspect, an electrochemical device is provided, the device including a compound of Formula (I):

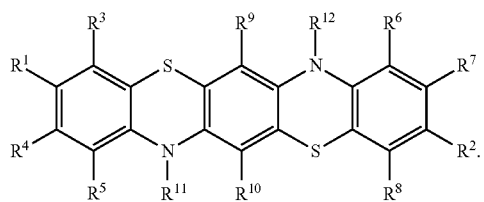

In Formula (I), $R^1$ and $R^2$ are individually alkyl, alkoxy, or aryloxy; $R^3$, $R^4$, $R^5$, $R^6$, $R^7$, $R^8$ are individually H, alkoxy, or aryloxy; $R^9$ and $R^{10}$ are individually alkoxy, or aryloxy, or where $R^1$ and $R^2$ are alkyl, $R^9$ and $R^{10}$ are individually H, alkoxy, or aryloxy; $R^{11}$ and $R^{12}$ are individually alkyl or $-(CH_2)_nN^+(R^{20})_3$ [X] wherein n is from 1 to 20; each $R^{20}$ is individually alkyl; and X is an anion. The device may further include an electrochromic medium having an anodic material that includes the compound of Formula (I). Illustrative electrochromic devices include, but are not limited to, a mirror, an architectural window, an aircraft window, and a switchable electro-optic filter.

In another aspect, a compound of Formula (I) is provided:

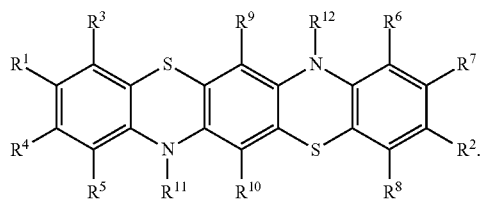

In Formula (I), $R^1$ and $R^2$ are individually alkyl, alkoxy, or aryloxy; $R^3$, $R^4$, $R^5$, $R^6$, $R^7$, $R^8$ are individually H, alkoxy, or aryloxy; $R^9$ and $R^{10}$ are individually alkoxy, or aryloxy, or where $R^1$ and $R^2$ are alkyl, $R^9$ and $R^{10}$ are individually H, alkoxy, or aryloxy; $R^{11}$ and $R^{12}$ are individually alkyl or $-(CH_2)_nN^+(R^{20})_3$ [X] wherein n is from 1 to 20; each $R^{20}$ is individually alkyl; and X is an anion. The device may further include an electrochromic medium having an anodic material that includes the compound of Formula (I). Illustrative electrochromic devices include, but are not limited to, a mirror, an architectural window, an aircraft window, and a filter.

DETAILED DESCRIPTION

Figure 1:
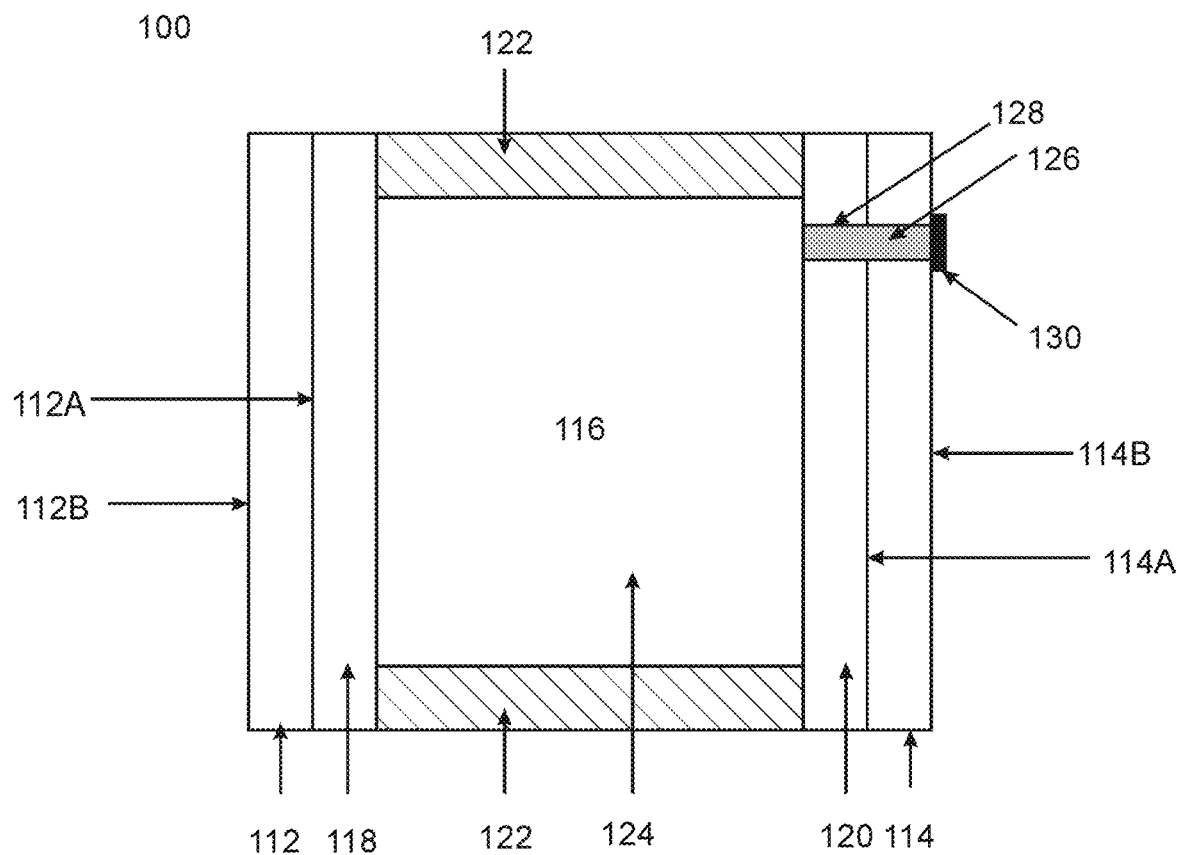
FIG. 1 is a cross-sectional schematic representation of an electrochromic device, according to one embodiment.
Figure 2:
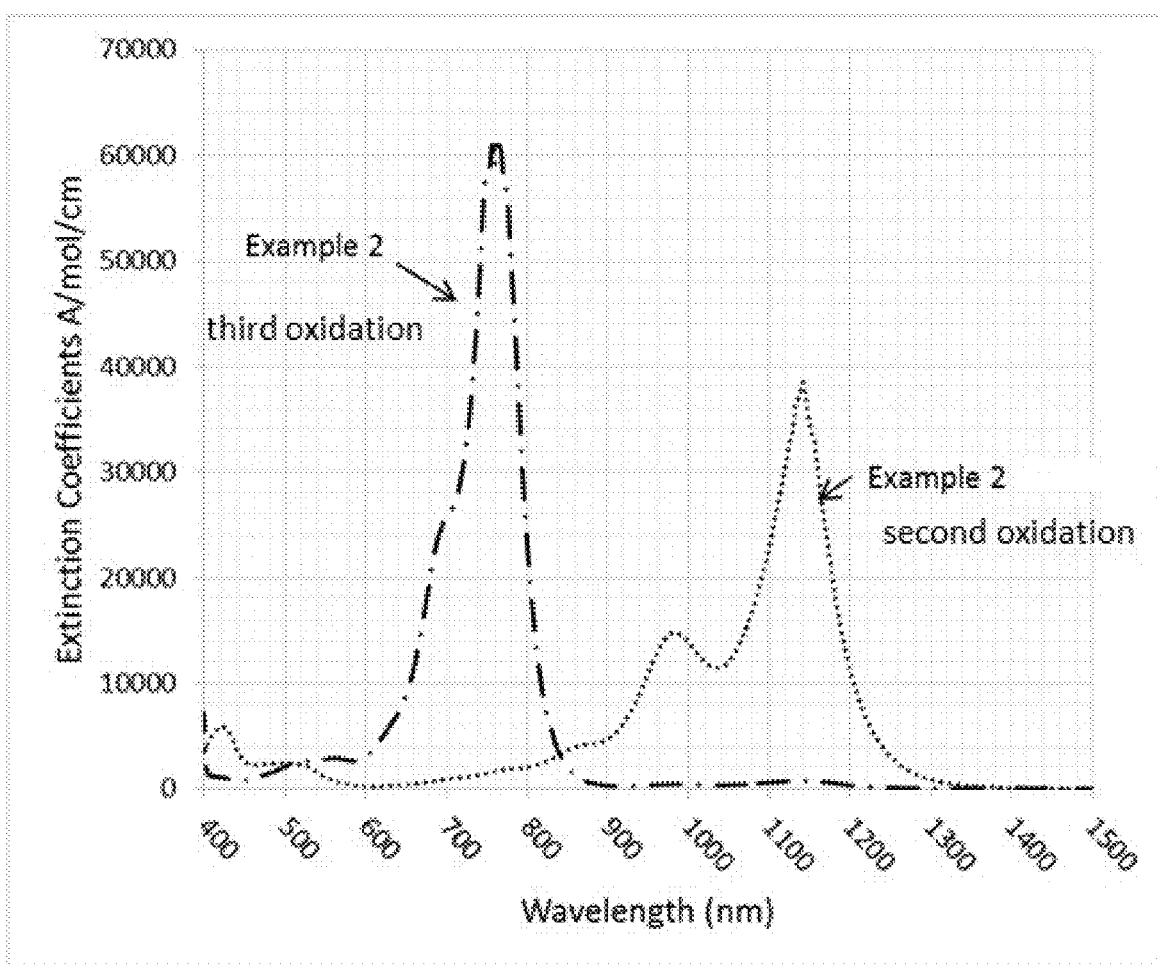
FIG. 2 is an absorbance spectrum of the second and third oxidation state products of 3,10-di-t-butyl-7,14-(4-triethylammoniumbutyl) triphenodithiazine bis(tetrafluoroborate), according to Example 2.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be constructed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like. Such substitution includes solubility enhancing groups as described in U.S. Pat. No. 6,445,486.

As used herein, $C_m$-$C_n$, such as $C_1$-$C_{12}$, $C_1$-$C_8$, or $C_1$-$C_6$ when used before a group refers to that group containing m to n carbon atoms.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

"TFSI" as used herein refers to bis(trifluoromethanesulfonyl)imide, as illustrated below:

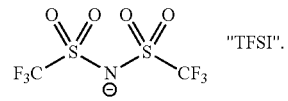

In one aspect, near infra-red (NIR) absorbing compounds are prepared, which, when used in an electrochromic device are stable when subjected to ultraviolet (UV) and thermal cycling. The compounds exhibit a higher oxidation potential than other anodic compounds, and because of the higher oxidation potential, the compounds are less air-sensitive for handling and in devices constructed with the materials. The NIR absorbing compounds may exist in one of three oxidation states: (1) a first oxidation state (e.g., neutral state); (2) a second oxidation state (e.g., oxidation to a radical cation); and (3) a third oxidation state (e.g., oxidation to a dication), wherein the compound is stable against decomposition at each state under UV and thermal cycling. A non-limiting example of an NIR absorbing compound and its first, second, and third oxidation states is shown in FIG.

Figure 3:
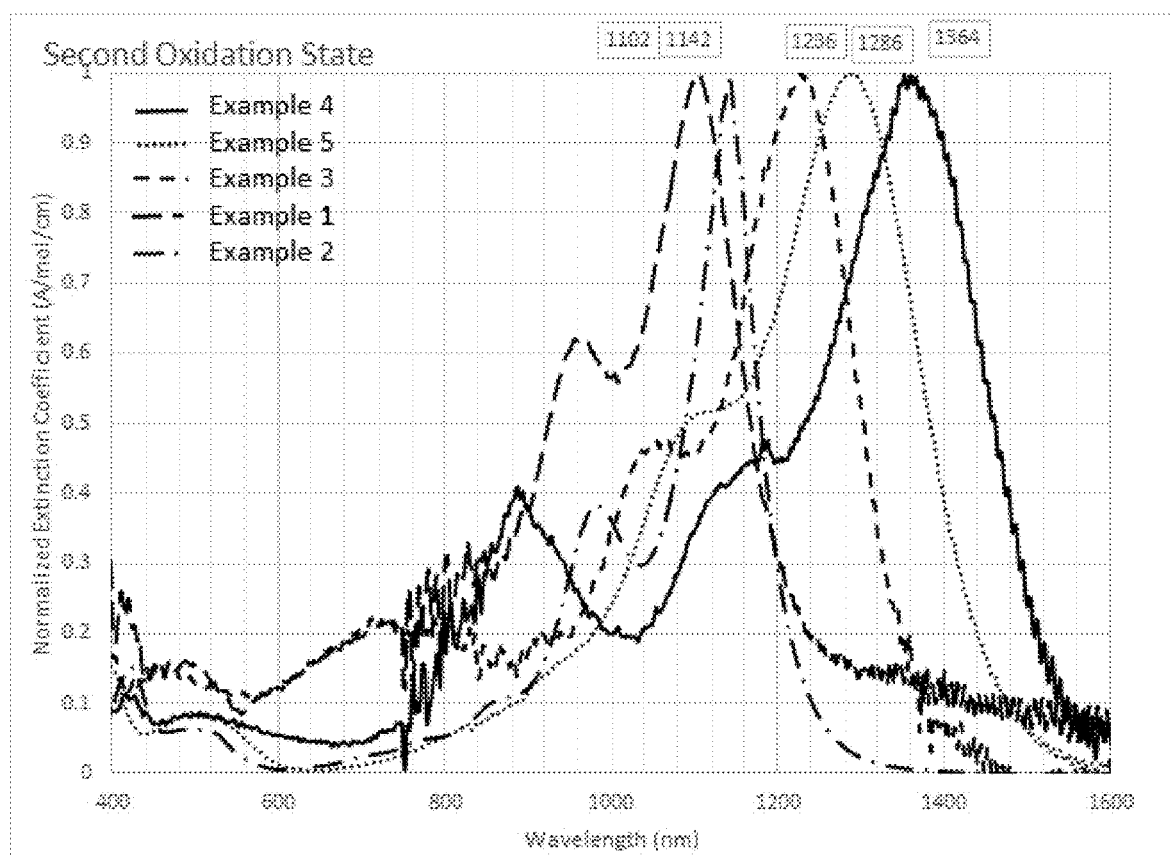
FIG. 3 is an absorbance spectrum of triphenodithiazines in the second oxidation state, according to Examples 1-5.
Figure 4:
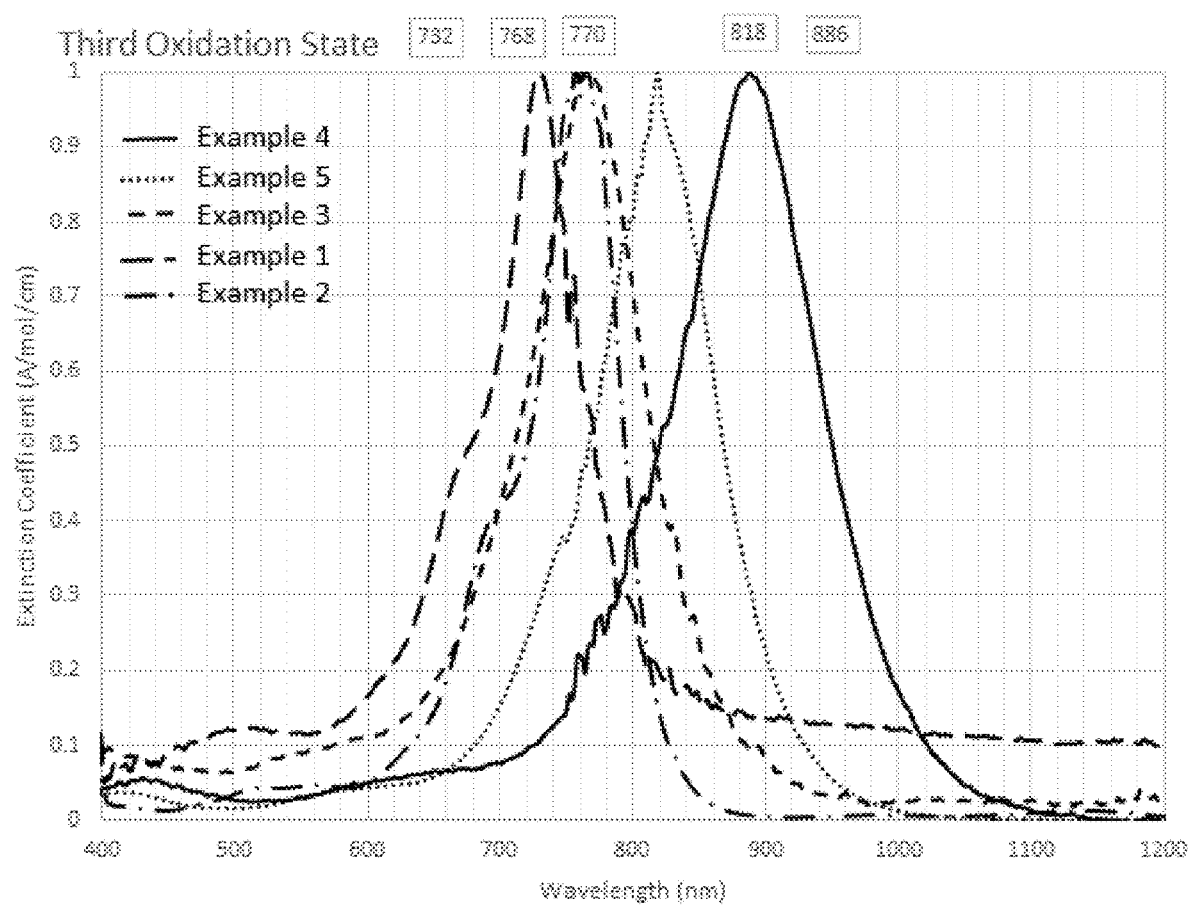
FIG. 4 is an absorbance spectrum of a triphenodithiazines in the third oxidation state, according to Examples 1-5.

14. Non-limiting examples of NIR absorbance spectra were collected for NIR absorbing compounds in the second and third oxidation states. See FIGS. 3 and 4. The compounds may find use in a wide range of devices including, but not limited to electrochromic devices, and as photographic infrared (IR) filters. As used herein, near infra-red or "NIR" refers to light with a wavelength within the range of 700 nm to 1400 nm, inclusive of endpoints.

It has been discovered that certain triphenodithiazine compounds have very high absorbance in near infrared region in the third oxidation state without having significant absorbance in visible region. The electro-optic device with these compounds is capable of reversibly attenuating the transmittance in near infrared region without significantly affecting the visible region.

In some embodiments, the devices include a configuration where the near infrared absorption of the oxidized triphenodithiazine compound may be observed in the absence of intereference by the absorbance of a cathodic species in solution. In other words, where the near infrared absorption is observed, the device, in that particular region, may appear colorless (i.e. low or minimal absorption in the visible spectrum).

In one aspect, triphenodithiazines are provided that exhibit good stability under severe testing conditions in electrochromic devices. Such materials may find use in mirror assemblies, architectural window assemblies, aircraft window assemblies, filter assemblies, and the like.

In another aspect, provided herein are electrochromic devices containing an anodic compound, wherein under an applied voltage of sufficient magnitude, the anodic compound can access a stable third oxidation state. In some embodiments, the anodic compound accesses the stable third oxidative state. As used herein, a compound in the "stable third oxidation state" refers to a compound that is stable against decomposition while existing in the third oxidation state under UV and thermal cycling. As used herein, an "applied voltage of sufficient magnitude" refers to from about 0.1 volts to about 3 volts. In some embodiments, the applied voltage of sufficient magnitude is about 800 mV to about 1.4 volts. Previously known anodic compounds do not remain stable to decomposition once in the third oxidation state under UV and thermal cycling. The anodic compound of the present technology may be a compound of Formula (I) as described herein. The electrochromic device may include, but is not limited to, a mirror, an architectural window, an aircraft window, a filter, or a battery.

The triphenodithiazines are represented by Formula (I):

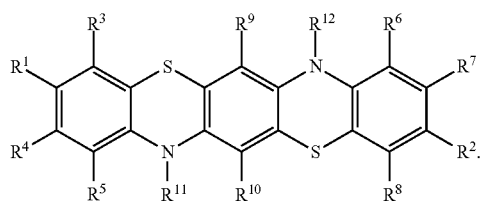

(I)

In Formula (I), $R^1$ and $R^2$ are individually alkyl, alkoxy, or aryloxy; $R^3$, $R^4$, $R^5$, $R^6$, $R^7$, $R^8$ are individually H, alkoxy, or aryloxy; $R^9$ and $R^{10}$ are individually alkoxy, or aryloxy, or where $R^1$ and $R^2$ are alkyl, $R^9$ and $R^{10}$ are individually H, alkoxy, or aryloxy; $R^{11}$ and $R^{12}$ are individually alkyl or —$(CH_2)_n N^+(R^{20})^3$ [X], wherein n is from 1 to 20; each $R^{20}$ is individually alkyl; and X is an anion.

In any of the above embodiments, $R^1$ and $R^2$ may individually be $C_1$-$C_{12}$-alkoxy, a group of formula $R^{21}$[O$(CH_2)_x]_q$O—, or $C_6$-$C_{20}$-aryloxy, wherein $R^{21}$ is alkyl, x is 1, 2, 3, or 4, and q is an integer from 1 to 20. In any of the above embodiments, $R^9$ and $R^{10}$ may both be an $C_1$-$C_{12}$-alkoxy, a group of formula $R^{21}$[O$(CH_2)_x]_q$O—, or $C_6$-$C_{20}$-aryloxy, wherein $R^{21}$ is alkyl, x is 1, 2, 3, or 4, and q is an integer from 1 to 20.

In some embodiments of the compound of Formula (I), $R^1$ and $R^2$ are individually alkyl; $R^3$, $R^4$, $R^5$, $R^6$, $R^7$, $R^8$ are individually H; $R^9$ and $R^{10}$ are individually H or alkoxy; $R^{11}$ and $R^{12}$ are individually $C_1$-$C_{12}$-alkyl or —$(CH_2)_n N^+(R^{20})^3$ [X], wherein n is from 1 to 10; each $R^{20}$ is individually $C_1$-$C_6$-alkyl; and X is an anion. This includes where $R^1$ and $R^2$ are individually $C_1$-$C_6$-alkyl; $R^3$, $R^4$, $R^5$, $R^6$, $R^7$, $R^8$ are individually H; $R^9$ and $R^{10}$ are individually H or $C_1$-$C_6$-alkoxy; $R^{11}$ and $R^{12}$ are individually methyl, ethyl, n-propyl, iso-propyl, n-butyl, iso-butyl, sec-butyl, t-butyl, or —$(CH_2)_n N^+(R^{20})^3$ [X], wherein n is from 1 to 6; each $R^{20}$ is methyl or ethyl; and X is an anion.

In other embodiments of the compound of Formula (I), $R^1$ and $R^2$ are individually alkoxy or aryloxy; $R^3$, $R^4$, $R^5$, $R^6$, $R^7$, $R^8$ are individually H, $C_1$-$C_{12}$-alkoxy, or $C_6$-$C_{12}$-aryloxy; $R^9$ and $R^{10}$ are individually $C_1$-$C_{12}$-alkoxy, or $C_6$-$C_{12}$-aryloxy; $R^{11}$ and $R^{12}$ are individually $C_1$-$C_{12}$-alkyl or —$(CH_2)_n N^+(R^{20})^3$ [X] wherein n is from 1 to 20; each $R^{20}$ is individually $C_1$-$C_6$-alkyl; and X is an anion. This includes where $R^3$, $R^4$, $R^7$, $R^8$ are individually $C_1$-$C_{12}$-alkoxy, or $C_6$-$C_{12}$-aryloxy; and $R^5$ and $R^6$ are H. This also includes where $R^1$ and $R^2$ are individually $C_1$-$C_{12}$-alkoxy; $R^3$, $R^4$, $R^7$, $R^8$ are individually $C_1$-$C_{12}$-alkoxy; $R^5$ and $R^6$ are H; $R^9$ and $R^{10}$ are individually $C_1$-$C_{12}$-alkoxy; $R^{11}$ and $R^{12}$ are individually $C_1$-$C_{12}$-alkyl or —$(CH_2)_n N^+(R^{20})^3$ [X], or alkyl wherein n is from 1 to 20; each $R^{20}$ is individually $C_1$-$C_6$-alkyl; and X is an anion. In one illustrative embodiment of the triphenodithiazine represented as Formula (I), $R^1$ and $R^2$ are individually methoxy, ethoxyl, n-propoxy, iso-propoxy, n-butoxy, sec-butoxy, or t-butoxy; $R^3$, $R^4$, $R^7$, $R^8$ are individually methoxy, ethoxyl, n-propoxy, iso-propoxy, n-butoxy, sec-butoxy, or t-butoxy; $R^5$ and $R^6$ are H; $R^9$ and $R^{10}$ are individually methoxy, ethoxyl, n-propoxy, iso-propoxy, n-butoxy, sec-butoxy, or t-butoxy; $R^{11}$ and $R^{12}$ are individually methyl, ethyl, n-propyl, iso-propyl, n-butyl, iso-butyl, sec-butyl, t-butyl, or —$(CH_2)_n N^+(R^{20})^3$ [X], wherein n is from 1 to 6; each $R^{20}$ is individually methyl, ethyl, n-propyl, iso-propyl, n-butyl, iso-butyl, sec-butyl, or t-butyl; and X is an anion.

In any of the above embodiments, X may be F⁻, Cl⁻, Br⁻, I⁻, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)_2^-$, ⁻Al(OC$(CF_3)_3)_4$ or ⁻BAr$_4$, wherein Ar is a aryl or fluorinated aryl group. In one embodiment, X⁻ is ⁻BAr$_4$ and Ar is a pentafluorophenyl group. In some embodiments, X is a tetrafluoroborate or a bis(trifluoromethylsulfonyl) imide anion. When shown in any compound herein multiple X's may be a mixture of two or more such anions.

The above triphenodithiazines exhibit improved stability over some other anodic compounds in general, and other triphenodithiazines in particular. The triphenodithiazines also exhibit shifts in the absorption of light having wavelengths in the near infra-red (NIR) region. The present triphenodithiazines have a NIR absorption maxima from about 1102 nm to about 1364 nm for the second oxidation, and third oxidation absorption maxima of from 732 nm to about 886 nm. Such shifts can be useful in blocking NIR light wavelengths from penetrating into or being transmitted through a device where the triphenodithiazine is incorporated into the device. Illustrative devices that may incorporate the triphenodithiazines described herein may include, but are not limited to, a window, an aircraft transparency, a mirror, a display device, a light filter and the like.

While in the second or third oxidation states, the triphenodithiazines disclosed herein may exhibit near infra-red light absorption without significant light absorption in the visible light range. In some embodiments, the triphenodithiazines exhibit less than 10% of its total light absorption in the visible light range. This includes less than 9, 8, 7, 6, 5, 4, 3, 2, or 1% of its total light absorption in the visible light range. In some embodiments, the triphenodithiazines exhibit about 1, 2, 3, 4, 5, 6, 7, 8, 9, or 10%, including increments therein, of its total light absorption in the visible light range.

In one aspect, an electrochromic device is provided, the device including a triphenodithiazine represented by Formula (I):

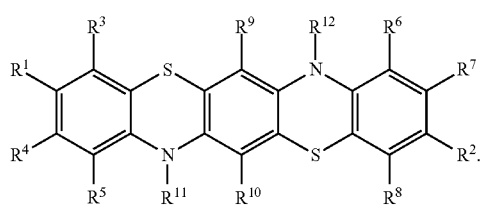

In Formula (I), $R^1$ and $R^2$ are individually alkyl, alkoxy, or aryloxy; $R^3$, $R^4$, $R^5$, $R^6$, $R^7$, $R^8$ are individually H, alkoxy, or aryloxy; $R^9$ and $R^{10}$ are individually alkoxy, or aryloxy, or where $R^1$ and $R^2$ are alkyl, $R^9$ and $R^{10}$ are individually H, alkoxy, or aryloxy; $R^{11}$ and $R^{12}$ are individually alkyl or —$(CH_2)_nN^+(R^{20})_3$ [X], wherein n is from 1 to 20; each $R^{20}$ is individually alkyl; and X is an anion. In any of the above embodiments, $R^1$ and $R^2$ may be other than OMe, when $R^3$-$R^{10}$ are all H, and $R^{11}$ and $R^{12}$ are —$(CH_2)_nN^+(R^{20})_3$ [X].

In any of the above embodiments, $R^1$ and $R^2$ may individually be $C_1$-$C_{12}$-alkoxy, a group of formula $R^{21}$[O(CH$_2$)$_x$]$_q$O—, or $C_6$-$C_{20}$-aryloxy, wherein $R^{21}$ is alkyl, x is 1, 2, 3, or 4, and q is an integer from 1 to 20. In any of the above embodiments, $R^9$ and $R^{10}$ may both be an $C_1$-$C_{12}$-alkoxy, a group of formula $R^{21}$[O(CH$_2$)$_x$]$_q$O—, or $C_6$-$C_{20}$-aryloxy, wherein $R^{21}$ is alkyl, x is 1, 2, 3, or 4, and q is an integer from 1 to 20.

In some embodiments of the compound of Formula (I), $R^1$ and $R^2$ are individually alkyl; $R^3$, $R^4$, $R^5$, $R^6$, $R^7$, $R^8$ are individually H; $R^9$ and $R^1$ are individually H or alkoxy; $R^{11}$ and $R^{12}$ are individually $C_1$-$C_{12}$-alkyl, —$(CH_2)_nN^-(R^{20})_3$ [X], wherein n is from 1 to 10; each $R^{20}$ is individually $C_1$-$C_6$-alkyl; each $R^{50}$ is a $C_1$-$C_6$-alkyl; and X is an anion. This includes where $R^1$ and $R^2$ are individually $C_1$-$C_6$-alkyl; $R_3$, $R_4$, $R_5$, $R_6$, $R_7$, $R_8$ are individually H; $R^9$ and $R^{10}$ are individually H or $C_1$-$C_6$-alkoxy; $R^{11}$ and $R^{12}$ are individually methyl, ethyl, n-propyl, iso-propyl, n-butyl, iso-butyl, sec-butyl, t-butyl, —$(CH_2)_nN^-(R^{20})_3$ [X], wherein n is from 1 to 6; each $R^{20}$ is methyl or ethyl; and X is an anion.

In other embodiments of the compound of Formula (I), $R^1$ and $R^2$ are individually alkoxy or aryloxy; $R_3$, $R_4$, $R_5$, $R_6$, $R_7$, $R_8$ are individually H, $C_1$-$C_{12}$-alkoxy, or $C_6$-$C_{12}$-aryloxy; $R^9$ and $R^{10}$ are individually $C_1$-$C_{12}$-alkoxy, or $C_6$-$C_{12}$-aryloxy; $R^{11}$ and $R^{12}$ are individually $C_1$-$C_{12}$-alkyl or —$(CH_2)_nN^+(R^{20})_3$ [X] wherein n is from 1 to 20; each $R^{20}$ is individually $C_1$-$C_6$-alkyl; and X is an anion. This includes where $R^3$, $R^4$, $R^7$, $R^8$ are individually $C_1$-$C_{12}$-alkoxy, or $C_6$-$C_{12}$-aryloxy; and $R^5$ and $R^6$ are H. This also includes where $R^1$ and $R^2$ are individually $C_1$-$C_{12}$-alkoxy; $R^3$, $R^4$, $R^7$, $R^8$ are individually $C_1$-$C_{12}$-alkoxy; $R^5$ and $R^6$ are H; $R^9$ and $R^{10}$ are individually $C_1$-$C_{12}$-alkoxy; $R^{11}$ and $R^{12}$ are individually $C_1$-$C_{12}$-alkyl or —$(CH_2)_nN^+(R^{20})_3$ [X] wherein n is from 1 to 20; each $R^{20}$ is individually $C_1$-$C_6$-alkyl; and X is an anion. In one illustrative embodiment of the triphenodithiazine represented as Formula (I), $R^1$ and $R^2$ are individually methoxy, ethoxyl, n-propoxy, iso-propoxy, n-butoxy, sec-butoxy, or t-butoxy; $R^3$, $R^4$, $R^7$, $R^8$ are individually methoxy, ethoxyl, n-propoxy, iso-propoxy, n-butoxy, sec-butoxy, or t-butoxy; $R^5$ and $R^6$ are H; $R^9$ and $R^{10}$ are individually methoxy, ethoxyl, n-propoxy, iso-propoxy, n-butoxy, sec-butoxy, or t-butoxy; $R^{11}$ and $R^{12}$ are individually methyl, ethyl, n-propyl, iso-propyl, n-butyl, iso-butyl, sec-butyl, t-butyl, or —$(CH_2)_nN^+(R^{20})_3$ [X] wherein n is from 1 to 6; each $R^{20}$ is individually methyl, ethyl, n-propyl, iso-propyl, n-butyl, iso-butyl, sec-butyl, or t-butyl; and X is an anion.

In any of the above embodiments, X may be F$^-$, Cl$^-$, Br$^-$, I$^-$, BF$_4^-$, PF$_6^-$, SbF$_6^-$, AsF$_6^-$, ClO$_4^-$, SO$_3$CF$_3^-$, N(CN)$_2^-$, N(CF$_3$SO$_2$)$_2^-$, C(CF$_3$SO$_2$)$_3^-$, N(SO$_2$C$_2$F$_5$)$_2^-$, Al(OC(CF$_3$)$_3$)$_4^-$ or $^-$BAr$_4$, wherein Ar is a aryl or fluorinated aryl group. In one embodiment, X$^-$ is $^-$BAr$_4$ and Ar is a pentafluorophenyl group. In some embodiments, X is a tetrafluoroborate or a bis(trifluoromethylsulfonyl) imide anion. When shown in any compound herein multiple X's may be a mixture of two or more such anions.

In addition to the triphenodithiazines described herein, the electrochromic medium may include at least one solvent and at least one cathodic material. The cathodic material may be a viologen; a polymeric film such as various substituted polythiophenes, polymeric viologens; an inorganic film; or a solid transition metal oxide, including, but not limited to, tungsten oxide.

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

The electrochromic medium may include a mixture of the triphenodithiazines of Formula (I) in combination with other anodic (i.e. oxidizable) materials. Illustrative anodic materials may include, but are not limited to, metallocenes, 5,10-dihydrophenazines, phenothiazines, phenoxazines, carbazoles, triphendioxazines, and related compounds. Anodic materials included in the electrochromic medium may include any one of a number of materials including ferrocene, substituted ferrocenes, substituted ferrocenyl salts, phenazine, substituted phenazines, phenothiazine, substituted phenothiazines, including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP), and bis(butyltriethylammonium)-para-methoxytriphenodithiazine (TPDT).

It is also contemplated that the anodic material may include a polymer film, such as polyaniline, polythiophenes, polymeric metallocenes, or a solid transition metal oxide, including, but not limited to, oxides of vanadium, nickel, iridium, as well as numerous heterocyclic compounds, etc. It will be understood that numerous other anodic materials are contemplated for use including those disclosed in U.S. Pat. Nos. 4,902,108; 6,188,505; 6,710,906; and 7,428,091. In another embodiment, at least one of the anodic electro-active material includes a substituted or unsubstituted phenazine compound. In another embodiment, at least one of the anodic electroactive material includes a substituted or unsubstituted 2,7-dialkyl-5,10-dialkyl-5,10-dihydrophenazine compound. In another embodiment, at least one alkyl group of the 5,10-dialkyl groups attached to the phenazine compound includes at least 4 carbon atoms and is devoid of any β hydrogen atoms, and at least one alkyl group of the 2,7-dialkyl groups attached to the phenazine compound includes at least 4 carbons. In another embodiment, at least one alkyl group of the 5,10-dialkyl groups attached to the phenazine compound includes a substituted or unsubstituted neopentyl group, and at least one alkyl group of the 2,7-dialkyl groups attached to the phenazine compound includes a substituted or unsubstituted isopropyl, isobutyl, (2-ethylbutyl), or (2-propylpentyl) group. In some embodiments, at least one alkyl group of the 5,10-dialkyl groups attached to the phenazine compound includes a neopentyl group, and at least one alkyl group of the 2,7-dialkyl groups attached to the phenazine compound includes a 2-ethyl-1-butanol group. In another embodiment, at least one alkyl group of the 5,10-dialkyl groups attached to the phenazine compound includes a neopentyl group, and at least one alkyl group of the 2,7-dialkyl groups attached to the phenazine compound includes an isobutyl group.

In some embodiments, a solvent of the electrochromic medium may include, but is not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, γ-butyrolactone, γ-valerolactone; propylene carbonate (PC), ethylene carbonate; oligoethers; ionic liquids, such as pyridinium-, imidazolium-, and pyrrolidinium-compounds; and homogenous mixtures of any two or more such solvents. Where the solvent includes an ionic liquid, the counterion may be $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)^-$, $^-Al(OC(CF_3)_3)_4$ or $^-BAr_4$ where Ar is a aryl or fluorinated aryl group, or other counterions used in ionic liquids. In one embodiment, the counterion is $^-BAr_4$ and Ar is a pentafluorophenyl group. In another embodiment, the electrochromic composition may include a solvent that includes propylene carbonate. While specific solvents have been disclosed as being associated with the electrochromic composition, numerous other solvents that would be known to those having ordinary skill in the art having the present disclosure before them are likewise contemplated for use. For example, in addition to the solvent, the electrochromic medium may be a gel composition.

In the electrochromic medium, one or more materials may undergo a change in phase during the operation of the device, for example, a material contained in solution in the ionically conducting electrolyte forms a layer on the electrically conducting electrode when electrochemically oxidized or reduced.

In addition, the electrochromic medium may include other materials, such as light absorbers, light stabilizers, thermal stabilizers, antioxidants, oxygen scavengers, thickeners, viscosity modifiers, tint providing agents, redox buffers, and mixtures of any two or more such materials. Illustrative UV-stabilizers may include, but are not limited to, 2-ethyl-2-cyano-3,3-diphenyl acrylate; (2-ethylhexyl)-2-cyano-3,3-diphenyl acrylate; 2-(2'-hydroxy-4'-methylphenyl)benzotriazole, sold by Ciba-Geigy Corp. under the trademark Tinuvin P; 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); 2,4-dihydroxybenzophenone; 2-hydroxy-4-methoxybenzophenone; and 2-ethyl-2'-ethoxyanilide.

In one embodiment, the electrochromic medium further includes an anodic and/or cathodic color-stabilizing redox buffer. Suitable redox buffers include, among others, those disclosed in U.S. Pat. No. 6,188,505. Other examples of suitable anodic and cathodic redox buffers include, but are not limited to, metallocene (e.g., substituted ferrocenes), and metallocinium (e.g. ferrocinium) compounds.

In one embodiment, the electrochromic medium may further include a cross-linked polymer matrix, a free-standing gel, and/or a substantially non-weeping gel.

The electrochromic medium may be made up in layers and includes a material attached directly to an electrically conducting electrode or confined in close proximity thereto which remains attached or confined when electrochemically oxidized or reduced.

The electro-optic medium is operable between substantially clear and substantially opaque for at least one wavelength band.

In one aspect, an electrochromic device is provided which includes an electrochromic medium comprising an electrochromic compound as described herein and at least one chamber defined by a first conductive surface of first substrate, a second conductive surface of a second substrate, and a sealing member joining the first substrate to the second substrate. The electrochromic medium is disposed within the chamber. The first and second substrates may be offset to one another to allow for electric contact to be made with the first and second conductive surfaces.

A schematic representation of an electrochromic device is shown in FIG. 1. The electrochromic device 100 includes first substrate 112 having a front surface 112A and a rear surface 112B, and a second substrate 114 having a rear surface 114A and a front surface 114B. The front surface 112A and the rear surface 114A have associated therewith conductive surfaces 118 and 120, respectively. The first substrate 112 and the second substrate 114, along with a sealing member 122 define a chamber 116 for containing an electrochromic medium 124. The device also includes one or more plugs 126 and 130 associated with one or more fill ports 128. The one or more fill ports 128 may be disposed within the first substrate 112, the second substrate 114, or the sealing member 122. Upon mounting as a mirror, window, or other device, the electrochromic device 100 may optionally include a bezel that extends around a periphery of at least one of the first substrate 112 and the second substrate 114 to conceal and/or protect a bus connector (if present), the sealing member 122, one or more plugs 126 and 130, and the one or more fill ports 128.

Several other electrochromic device configurations are contemplated for use, including, but not limited to, those disclosed in U.S. Pat. Nos. 5,818,625; 6,597,489; and 6,700,692, all of which are hereby incorporated herein by reference in their entirety including all references incorporated therein.

In some embodiments, the first substrate may be fabricated from any one of a number of materials that are transparent or substantially transparent in the visible and NIR regions of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®. In another embodiment, the first substrate is fabricated from a sheet of glass having a thickness ranging from about 0.10 millimeters (mm) to about 12.7 mm. This may include any range of thickness such as from about 0.50 mm to about 1.50 mm, or from about 0.65 mm to about 1.00 mm. Of course, the thickness of the substrate will depend upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that first substrate and/or second substrate may comprise a UV absorbing layer and/or contain a UV absorbing material to help protect the substrate(s) and/or the electrochromic media from UV damage.

In some embodiments, the second substrate may be fabricated from similar materials as that of the first substrate, or where transparency of the second substrate is not desired, the second substrate may be a metal. The second substrate is fabricated from a sheet of glass or plastic having a thickness ranging from about 0.10 mm to about 12.7 mm. This may include thicknesses from about 0.50 mm to about 1.50 mm, or from about 0.65 mm to about 1.00 mm. If the first and second substrates are fabricated from sheets of glass, then the glass can optionally be tempered, heat strengthened, chemically strengthened, and/or laminated prior to or subsequent to being coated with layers of electrically conductive material.

One or more layers of electrically conductive material may be associated with the rear surface of the first substrate. These layers serve as an electrode for the electrochromic device. Electrically conductive material is desirably a material that: (a) is substantially transparent in the visible and/or NIR region of the electromagnetic spectrum; (b) bonds reasonably well to the first substrate; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that the electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art.

One or more layers of an electrically conductive material made of the same or different materials as those associated with the rear surface of the first substrate may be associated the front surface of the second substrate. The electrically conductive material may be operatively bonded to electrically conductive material associate with the first substrate by a sealing member. Once bonded, the sealing member, plug and/or the juxtaposed portions of electrically conductive materials may serve to generally define an inner peripheral geometry of a chamber. Alternatively, edge sealing techniques may be utilized which are disclosed in U.S. Pat. No. 7,372,611.

In some embodiments, the first substantially transparent substrate and second substantially transparent substrate have a cell distance of less than 600 µm. In another embodiment, the first substantially transparent substrate and second substantially transparent substrate have a cell distance of about 150 µm to about 600 µm, about 200 µm to about 300 µm, about 225 µm to about 275 µm, or ranges between any two of these values (including endpoints). In another embodiment, the first substantially transparent substrate and second substantially transparent substrate have a cell distance of about 350 µm, 300 µm, 275 µm, 250 µm, 225 µm, 200 µm, 175 µm, 150 µm, 125 µm, 100 µm, 90 µm, 80 µm, 70 µm, 60 µm, 50 µm, 40 µm, 30 µm, 20 µm, 10 µm, or ranges between any two of these values (including endpoints). In another embodiment, the first substantially transparent substrate and second substantially transparent substrate have a cell distance of about 250 µm.

In some embodiments, the sealing member may include any material that is configured to adhesively bond to the electrically conductive materials coated on the first and second substrate to, in turn, seal a chamber, (in certain embodiments in cooperation with a plug and fill port) so that electrochromic composition does not inadvertently leak out of the chamber or be exposed to the outside atmosphere. It is also contemplated that the sealing member extends all the way to rear surface and front surface of their respective substrates. In such an embodiment, the layers of electrically conductive material coated on the first and second substrates may be partially removed where the sealing member is positioned. If the electrically conductive materials are not associated with their respective substrates, then the sealing member preferably bonds well to glass. It will be understood that sealing member can be fabricated from any one of a number of materials including, for example, those disclosed in U.S. Pat. Nos. 4,297,401; 4,418,102; 4,695,490; 5,596,023; 5,596,024; 6,157,480; and 6,714,334.

In some embodiments, the concentration of the triphenodithiazine (anodic) and/or cathodic materials in the electrochromic medium may be from about 1 millimolar (mM) to about 500 mM. In some embodiments, the concentration of the anodic and/or cathodic materials in the electrochromic medium may be from about 2 mM to about 100 mM.

In one embodiment, at least one of the anodic electroactive materials has a concentration of at least 5 mM. In another embodiment, at least one of the anodic electroactive materials has a concentration of about 2 mM to about 100 mM, about 5 mM to about 50 mM, about 7 mM to about 50 mM, or ranges between any two of these values (including endpoints). In another embodiment, at least one of the anodic electroactive materials has a concentration of about 5 mM to about 7 mM. In another embodiment, a second anodic electroactive material has a concentration of about 40 mM to about 50 mM.

In one embodiment, at least one of the cathodic electroactive materials has a concentration of at least 50 mM. In another embodiment, at least one of the cathodic electroactive materials has a concentration of about 50 mM to about 100 mM, about 60 to about 90 mM, about 70 mM to about 80 mM, or ranges between any two of these values (including endpoints). In yet another embodiments, at least one of the cathodic electroactive materials has a concentration of about 10 mM to about 50 mM, about 20 to about 90 mM, about 30 mM to about 80 mM, or ranges between any two of these values (including endpoints).

Illustrative electrochromic devices employing the electrochromic compounds described herein may include, for illustrative purposes only, a window, an aircraft transparency, a mirror, a display device, a light filter and the like. It will be understood that like or analogous elements and/or components, and/or methods referred to herein, may be identified throughout the drawings with like reference characters. In some embodiments, the electrochromic device is an electrochromic window or an electrochromic mirror. In some embodiments, the device is a vehicular interior electrochromic mirror. In some embodiments, the device is a variable transmission electrochromic window. In some embodiments, the device is an aircraft window system. Other applications of the electrochromic device includes screens for watches, calculators and computer display screens; eye wear such as eyeglasses and sunglasses; switchable mirrors, sun visors; automobile, architectural, aircraft, marine, and spacecraft windows; information display boards and digital billboards, and the like.

Figure 5:
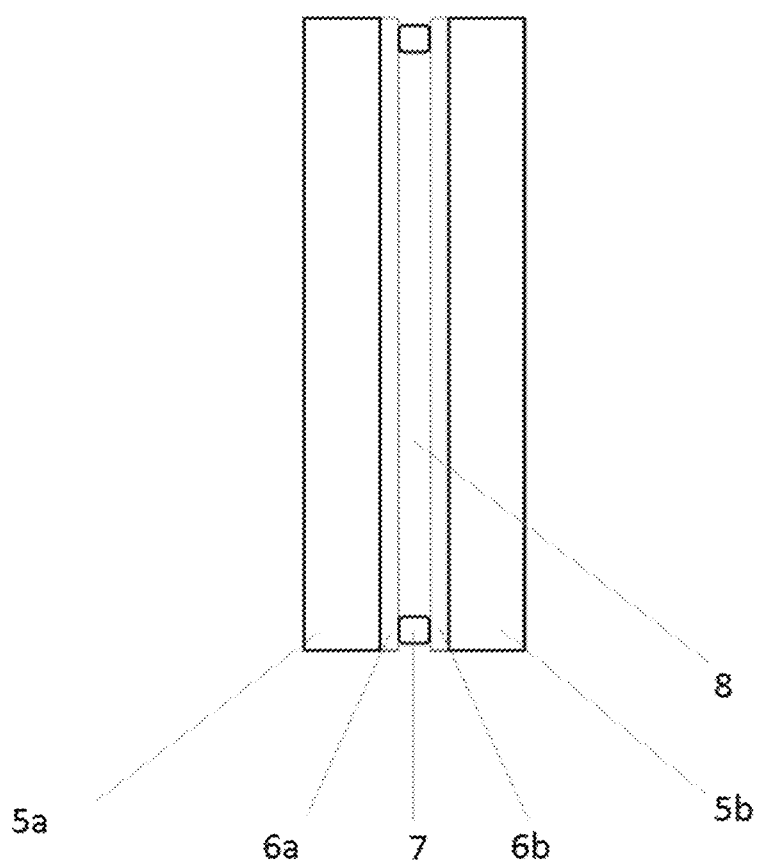
FIG. 5 is a cross-sectional schematic representation of an electro-optic cell for a non-limiting example of an electro-optic infrared filter.

In some embodiments, the electrochromic device is a switchable electro-optic infrared filter. In some embodiments, the switchable electro-optic infrared filter comprises an electro-optic cell. In some embodiments, the electro-optic cell comprises a first substrate 5a (also referred to as "substrate 1") defining a first surface and a second surface and a second substrate 5b (also referred to as "substrate 2") defining a third surface and a fourth surface (FIG. 5). Each of the second and third surfaces (also referred to as "surface 2" and "surface 3" herein) comprises a conductive layer (6a, 6b), such as ITO. The first and second substrates are positioned such that the second and third surfaces face each other in a spaced apart relationship, with a sealing member 7 in between, forming a cavity that is filled with an electrochromic medium 8. The electrochromic medium is variably transmissive to one or more wavelength bands of light. Electrical contacts are made to the second and third surface conductive layers in order to provide electrical current in order to switch the electro-optic medium between its substantially colorless and substantially colored states. In some embodiments, the electro-optic cell has a tranmissivity in the colorless state (e.g., clear state), or substantially colorless state, of greater than 20%, 30%, 40%, 50%, 60%, 70%, or 80% for near infrared light. In some embodiments, the electro-optic cell has a tranmissivity in the colored state (e.g., opaque state), or substantially colored state, of less than 60%, 50%, 40%, 30%, 20%, 10%, 9%, 8%, 7%, 6%, 5%, 4%, 3%, 2%, 1%, 0.5%, or 0.1% for near infrared light. Varying levels of transmissivity and opacity to near-infrared light may be obtained by partially transitioning the electro-optic cell between the substantially colorless (i.e., transparent) and substantially colored (i.e., opaque) states.

Figure 6:
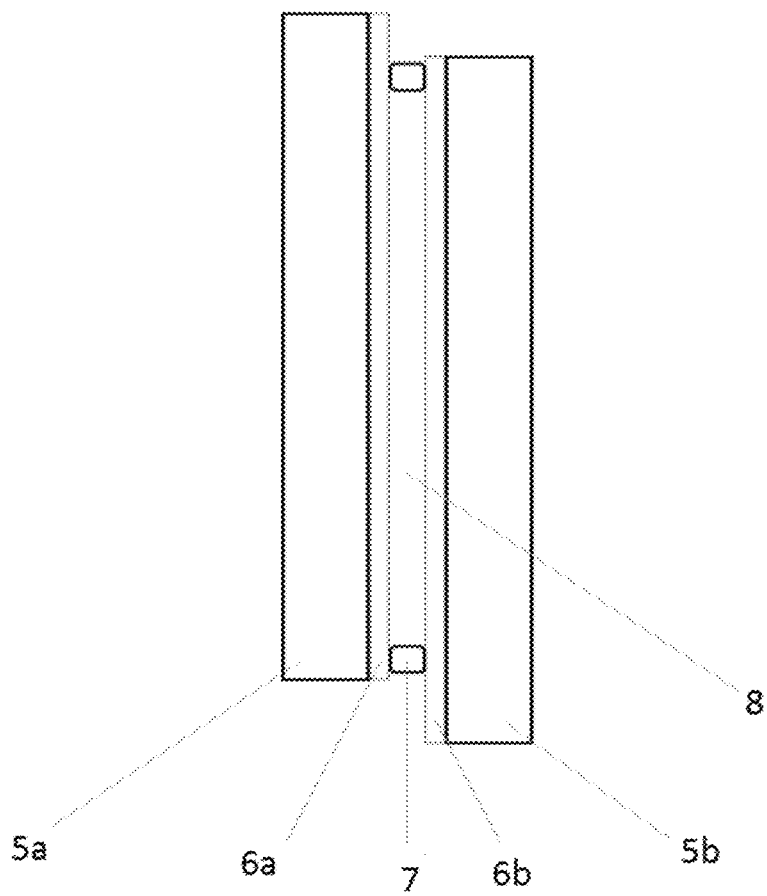
FIG. 6 is a cross-sectional schematic representation of an electro-optic cell for a non-limiting example of an electro-optic infrared filter.

In some embodiments, electrical contact to the conductive layers is simplified by offsetting the two glass substrates in order to expose electrode faces at each end of the cell (FIG. 6). Many other electrical contact methods are well characterized in the prior art (e.g., as described in U.S. Pat. No. 8,274,729) and can be adapted for use herein. When the cell is powered, the anodic material is oxidized at the anode surface and the cathodic species is reduced at the cathode surface. For a freely diffusing fluid cell, these activated species (i.e., oxidized anodic species and/or reduced cathodic species) then diffuse to a region approximately midway between the anode and cathode surfaces and undergo an electron transfer that returns them to the redox states they held prior to interaction with the energized electrode surfaces. Due to this diffusion process, the additive absorbance of the oxidized anodic species and the reduced cathodic species is observed in transmission through the electro-optic cell when it is powered. For certain applications, it may be preferred that the absorption of only one of the electrochromic species be observed in a particular region of the electro-optic cell. In these applications the electrode surfaces of the electro-optic cell may be configured in order to spatially separate the region of oxidation of the anodic compounds from the region of reduction of the cathodic compounds, forming one or more functional zones of the cell upon applied voltage of sufficient magnitude. As used herein, a "functional zone" comprises oxidized anodic species or reduced cathodic species, but not both.

Figure 7:
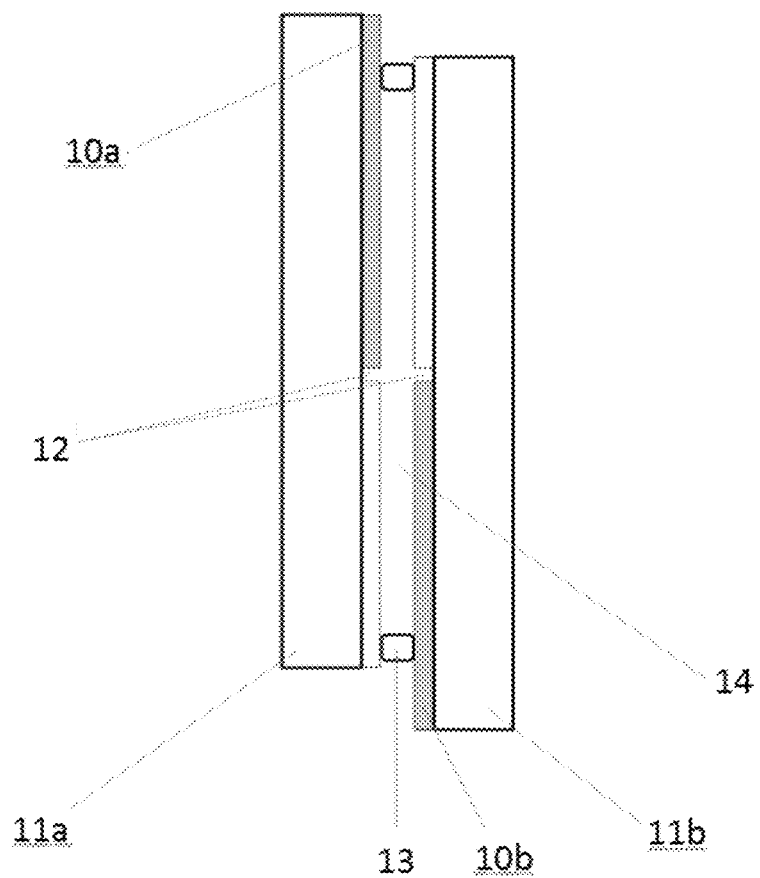
FIG. 7 is a cross-sectional schematic representation of an electro-optic cell with an isolated electrode cell design for a non-limiting example of an electro-optic infrared filter.

FIG. 7 shows a non-limiting example of an isolated electrode cell design. A first substrate 11a, a second substrate 11b, and seal 13 define a chamber containing electrochromic medium 14. The active regions of the electrode layers on surfaces 2 and 3 have been isolated and are non-overlapping when viewed from any vantage point perpendicular to surfaces 2 and 3 (electrical isolation shown at 12). This causes reduction of the cathodic species to be limited to the active region of the cathode (10b) and oxidation of the anodic species to be limited to the active region of the anode (10a), resulting in two separate functional zones within the cell upon applied voltage of sufficient magnitude. Diffusion of electrolyte between the two zones maintains charge balance. The isolation (12) of the active electrode regions can be accomplished by many means, such as, but not limited to, ablation, etching, masking, passivation, and patterning.

Figure 8:
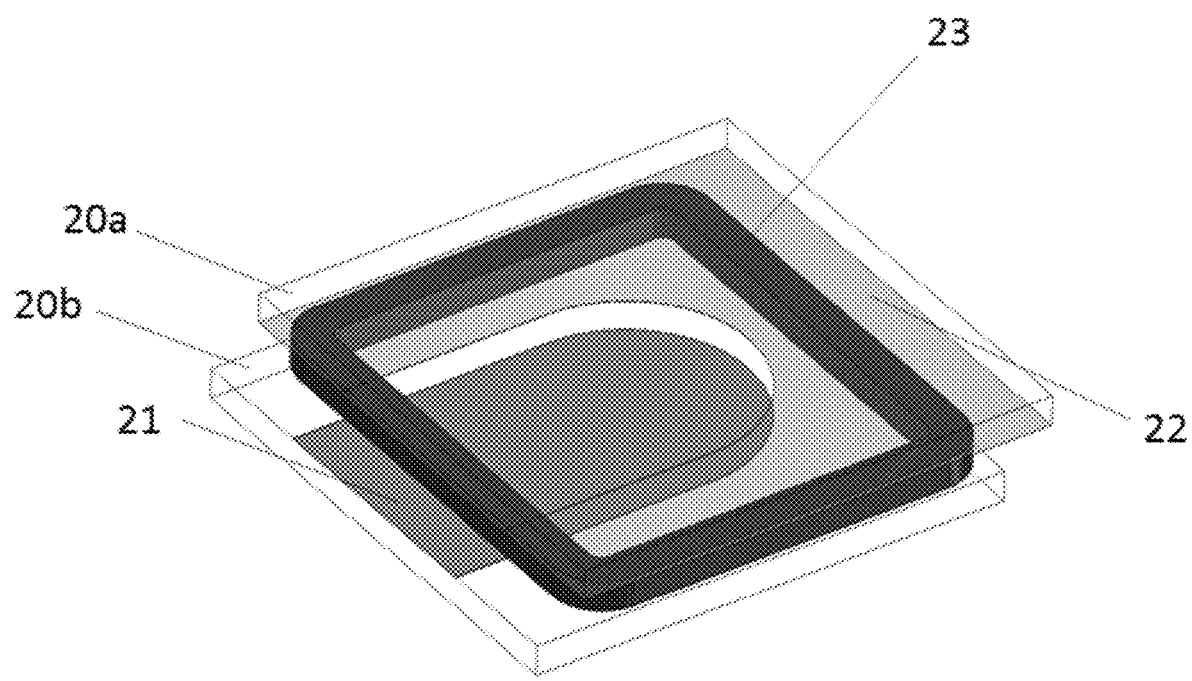
FIG. 8 is a schematic representation of an electro-optic cell with an isolated electrode cell design for a non-limiting example of an electro-optic infrared filter.

In some embodiments, an isolated electrode cell designed to be used as an electrochromic switchable optical filter has a form similar to that shown in FIG. 8. Substrate 20a and substrate 20b with sealing member 23 define a chamber with electrochromic medium. The active portion of the anode 21 is located in the active area of the filter (center) on surface 3 of substrate 20b and the active portion of the cathode 22 is limited to the perimeter, on surface 2 of substrate 20a. The active regions of the anode and cathode do not overlap across the gap defined between surfaces 2 and 3. This arrangement presents the colored version (oxidized) of the anodic species as the filter in the active area of the filter. This also isolates the colored version (reduced) of the cathodic species away from the active area of the filter so that its absorption does not affect the filter color.

Figure 9:
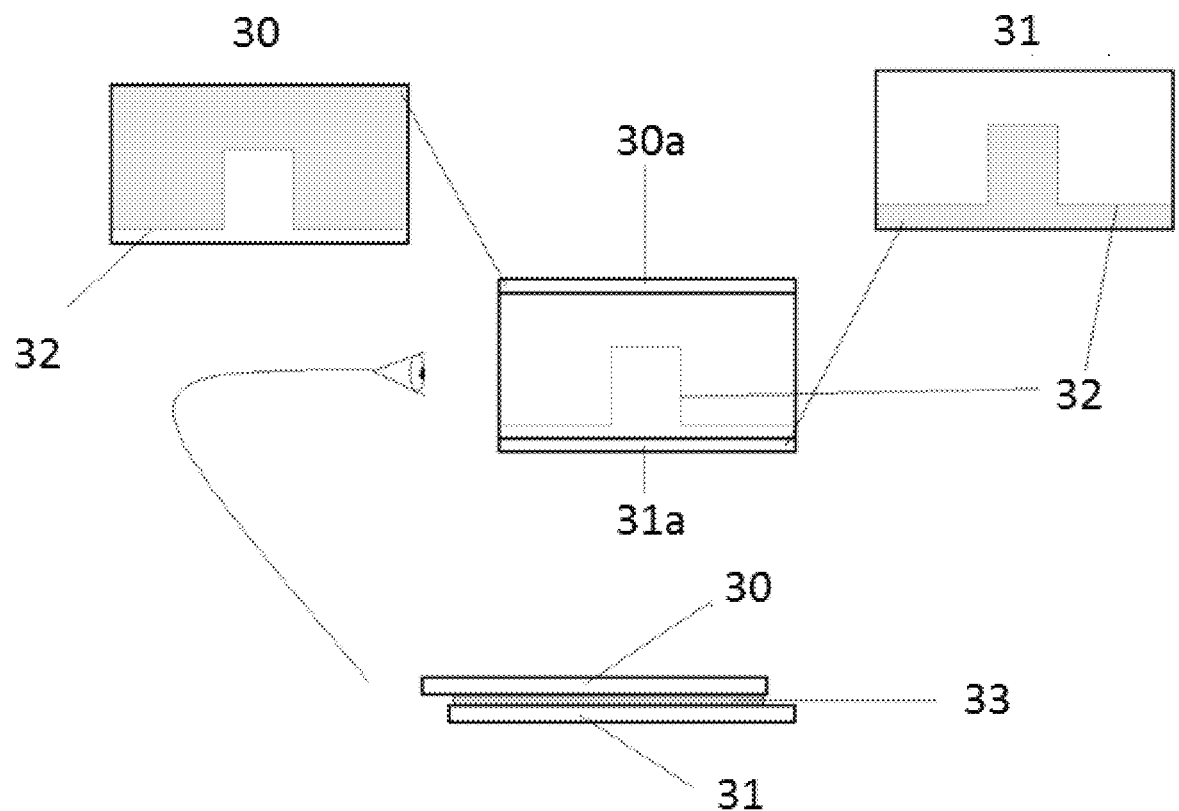
FIG. 9 depicts two schematic representations of an electro-optic cell with an isolated electrode cell design for a non-limiting example of an electro-optic infrared filter. The top half of FIG. 9 is an exploded view. The bottom half of FIG. 9 is a side-view of the same cell.

In some embodiments, an isolated electrode cell has a form similar to that shown in FIG. 9. The top half of FIG. 9 depicts an exploded view of the isolated electrode cell, and the bottom half depicts a side view of the cell. A first substrate with active cathode region 30 is arranged offset with a second substrate with active anode region 31. The two substrates with sealing member 33 define a chamber containing electrochromic medium. Active cathode region 30 (shaded in gray) is isolated from a non-active region (no shading) on the first substrate by laser ablation. Similarly, active anode region 31 (shaded in gray) is isolated from a non-active region (no shading) on the second substrate by laser ablation. Electrical contact to the cathode (30a) and to the anode (31a) regions are as shown. The non-active regions are devoid of electrical contact and cannot oxidize or reduce electroactive material in the electrochromic medium. As viewed from a vantage point perpendicular to the first and second substrates, there is little to no occlusion of the active anode region by the active cathode region, resulting in two functional zones within the cell upon applied voltage of sufficient magnitude: one zone comprising oxidized anodic species but no reduced cathodic species and another zone comprising reduced cathodic species but no oxidized anodic species. The functional zone comprising oxidized anodic species (e.g., one or more NIR compounds of the present technology in the second and/or third oxidation states) may serve as the active area of the filter.

Figure 13:
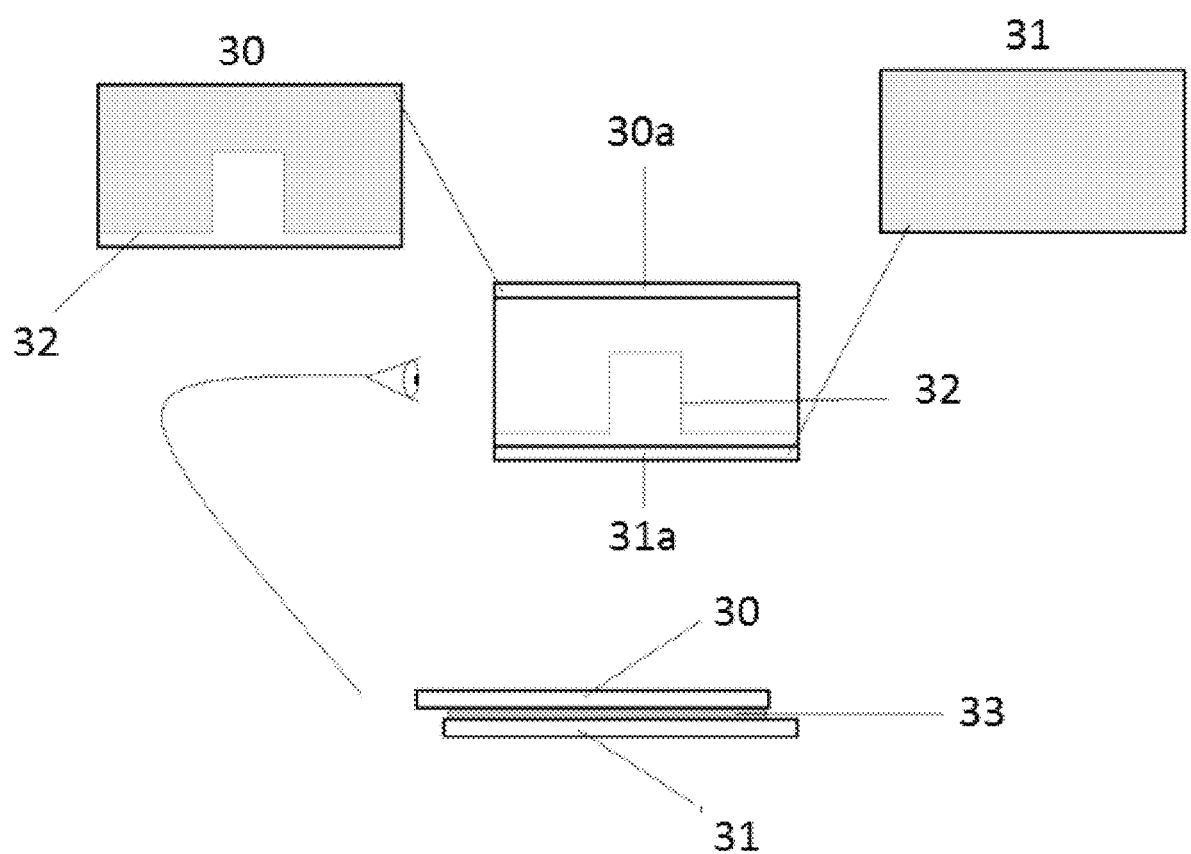
FIG. 13 depicts two schematic representations of an electro-optic cell with an isolated electrode cell design for a non-limiting example of an electro-optic infrared filter. The top half of FIG. 13 is an exploded view. The bottom half of FIG. 13 is a side-view of the same cell.
Figure 14:
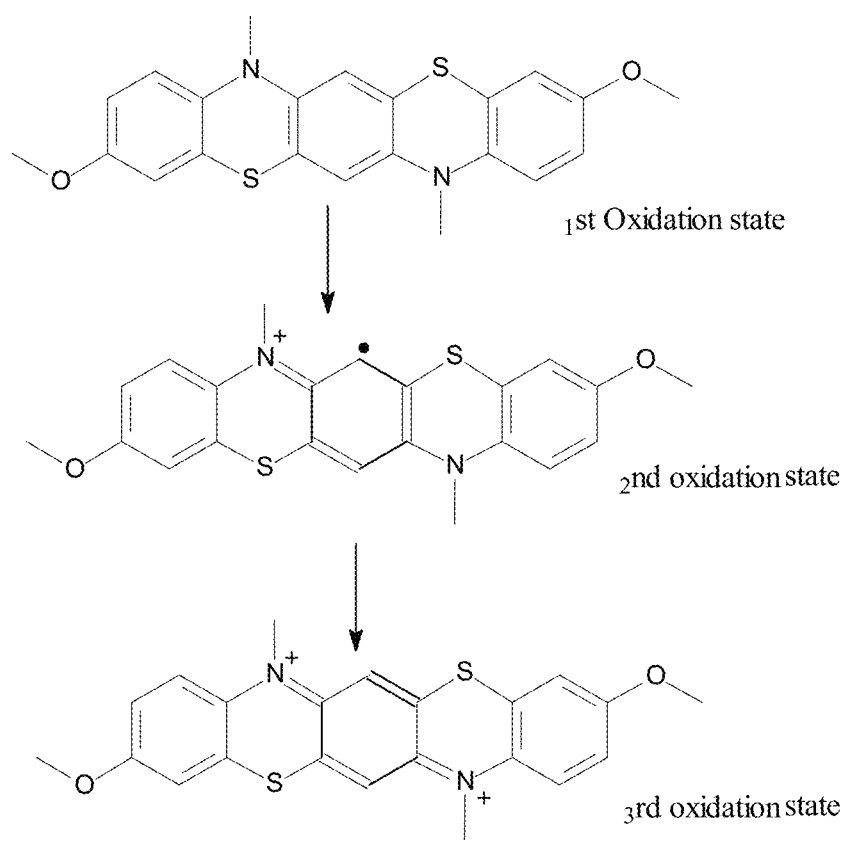
FIG. 14 depicts a non-limiting example of a triphenodithiazine in the first oxidation state, the second oxidation state, and third oxidation state.

In some embodiments, an isolated electrode cell has a form similar to that shown in FIG. 13. The top half of FIG. 13 depicts an exploded view of the isolated electrode cell, and the bottom half depicts a side view of the cell. A first substrate with active cathode region 30 is arranged offset with a second substrate with active anode region 31. The two substrates with sealing member 33 define a chamber containing electrochromic medium. Active cathode region 30 (shaded in gray) is isolated from a non-active region (no shading) on the first substrate by laser ablation. No laser ablation is performed on the second substrate, on which active anode region 31 is located. Electrical contact to the cathode (30*a*) and to the anode (31*a*) regions are as shown. The non-active region is devoid of electrical contact and cannot oxidize or reduce electroactive material in the electrochromic medium. As viewed from a vantage point perpendicular to the first and second substrates, there is partial occlusion of the active anode region by the active cathode region, resulting in one functional zone within the cell upon applied voltage of sufficient magnitude, the functional zone comprising oxidized anodic species (one or more NIR compounds of the present technology in the second and/or third oxidation states). This functional zone may serve as the active area of the filter.

Figure 15:
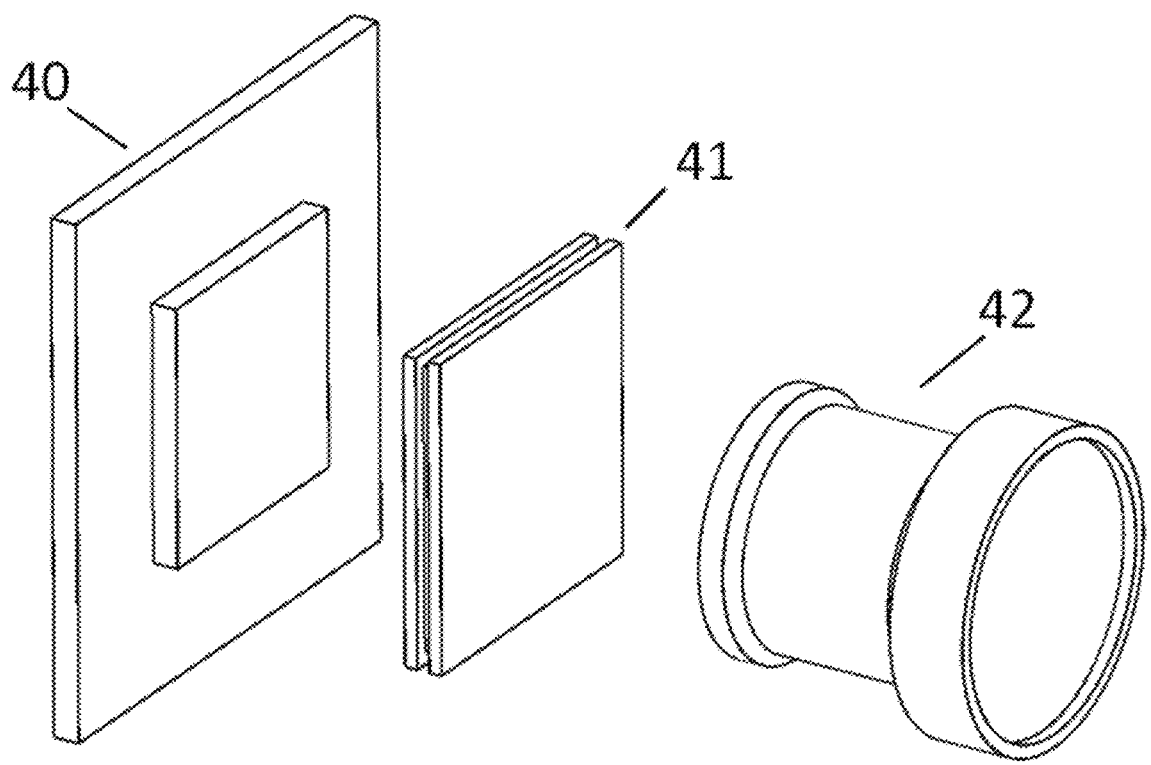
FIG. 15 depicts a non-limiting example of an imager assembly comprising a switchable electro-optic infrared filter described herein.

A switchable electro-optic infrared filter described herein may be incorporated into an imager assembly as shown in FIG. 15, wherein the filter 41 is situated between an imager on a circuit board 40 and a lens assembly 42.

The present invention, thus generally described, will be understood more readily by reference to the following examples, which are provided by way of illustration and are not intended to be limiting of the present invention.

EXAMPLES

The following examples more specifically illustrate protocols for preparing compounds and devices according to various embodiments described above. These examples should in no way be construed as limiting the scope of the present technology.

Example 1 (Comparative)

Synthesis of 7,14-dimethyltriphenodithiazine

This compound was synthesized over two steps as illustrated here:

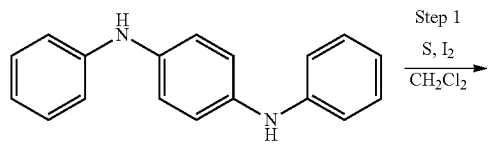

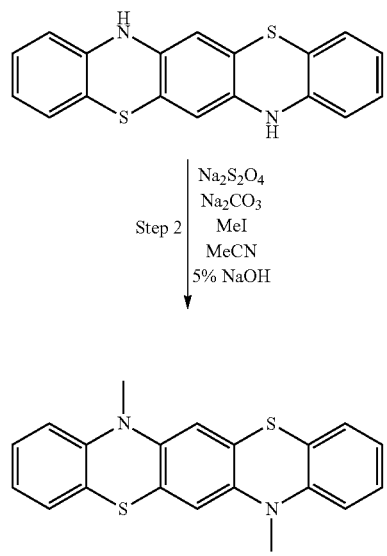

Step 1. To 500 ml three neck round bottom flask was added N,N'-diphenyl-1,4-phenylenediamine (26 g, 0.099 mol), sulfur (10 g), iodine (2.0 g), and dichlorobenzene (130 ml). The reaction mixture was heated to 180° C. for 24 hours. The reaction mixture was cooled to room temperature and added hexane (200 ml). The product was collected by filtration and washed with hexane to yield 27.2 g (95% yield) of triphenodithiazine.

Step 2. To 250 ml three neck round bottom flask was added triphenodithiazine (7.00 g, 0.022 mol), sodium dithionite (7.0 g), sodium carbonate (10 g), methyl tributyl ammonium chloride (1 ml), water (1 ml), acetonitrile (100 ml), and methyl iodide (20 ml). The reaction mixture was heated to reflux for 72 hours. More methyl iodide (20 ml), sodium dithionite (7.0 g), sodium carbonate (10 g) was added and refluxed for additional 24 hours to complete the reaction. After quenching with water (150 ml), the dimethyltriphenodithiazine was collected by filtration and washed with water to yield 6.6 g (86% yield) of product.

Example 2

3,10-di-t-butyl-7,14-(4-triethylammoniumbutyl) triphenodithiazine bis(tetrafluoroborate)

The product was synthesized over four steps as illustrated below:

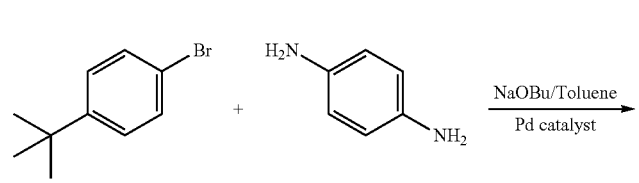

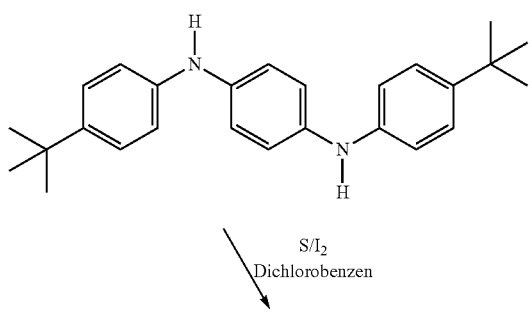

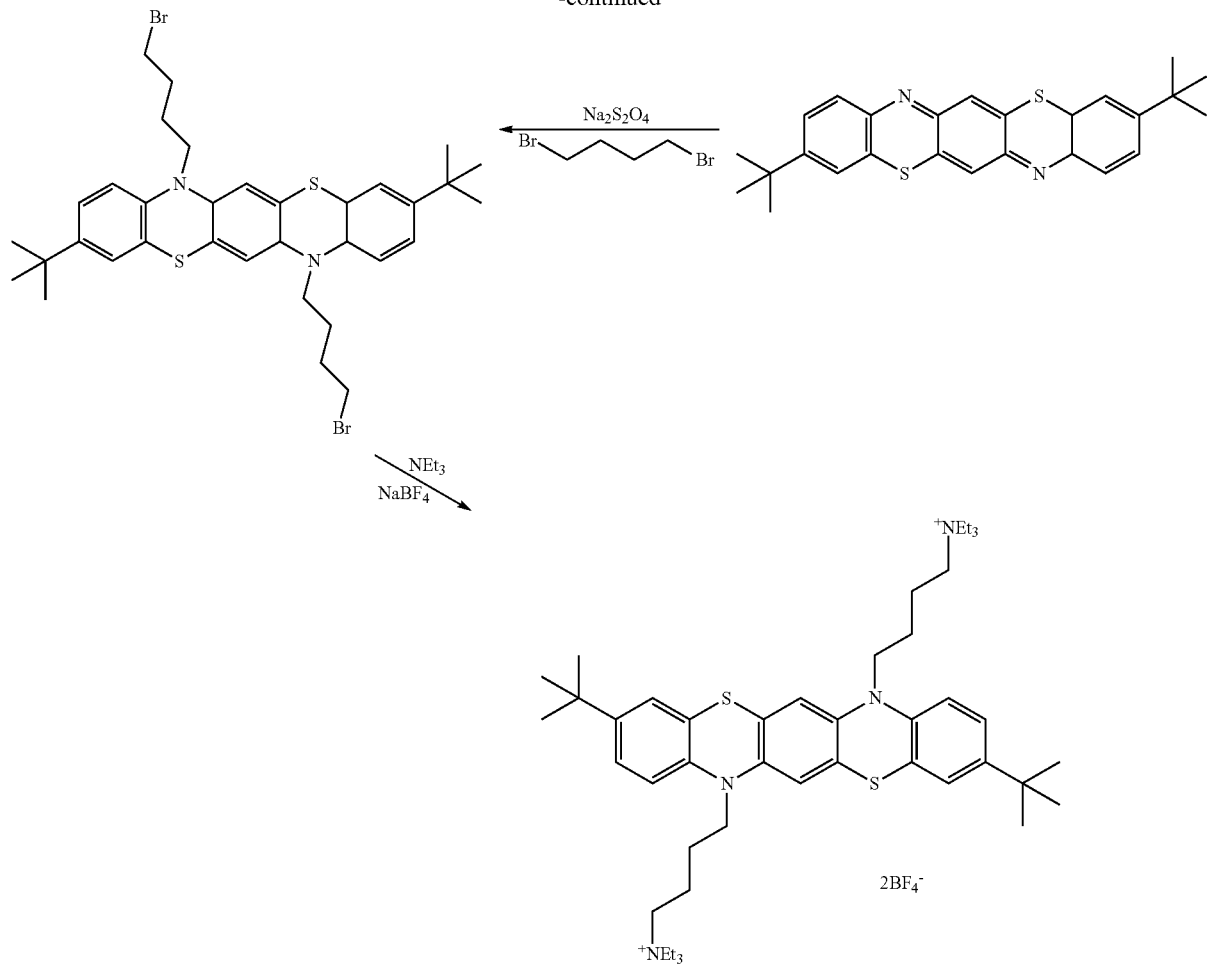

Step 1. N,N'-di tbutyl-1,4-phenylenediamine. A flame-dried, two liter three neck round bottom flask was charged with 1,4-phenylenediamine (108.14 g, 1 mol), 4-bromo-t-butyl benzene (447.3 g, 2.1 mol), 1,1'-bis(diphenylphosphino)ferrocene (1.6 g, 0.0028 mol), tris(dibenzylideneacetone)dipalladium(0) (0.8 g, 0.00087 mol), sodium t-butoxide (200 g, 2 mol), and anhydrous toluene (1300 ml). The reaction mixture was heated to 80° C. for 18 hours. The reaction mixture was cooled to room temperature and added 1000 ml hexane. After fitration, the solid was washed with hexane. The product was then reslurried in sodium dithionite solution (100 g in 1 L water) for 30 min, and again filtered and the solid was with water and dried to yield 246 g (66% yield).

Step 2. 3,10-di-t-butyltriphenodithiazine. To a 5 L flask charged with the product from Step 1 (181 g, 0.48 mol), sulfur (78 g), iodine (11.4 g) and dichlorobenzene (800 ml) were added and the flask heated to 180° C. for 48 hours. The reaction mixture was then cooled to room temperature and phenyl hydrazine (32.6 ml) was added. The reaction mixture was slowly heated to 160° C. for three hours, with the $H_2S$ gas that formed being scrubbed in a 20 wt % NaOH solution. The reaction mixture was then cooled to room temperature, and the product was collected by filtration and washed with hexane to yield 97 g (47% yield).

Step 3. 3,10-di t-butyl-7-14-(4-bromobutyl) triphenodithiazine. A mixture of 3,10-di-t-butyltriphenodithiazine (75 g, 0.173 mol), 50% sodium hydroxide (132 g), sodium dithionite (75 g), 1,4-dibromobutane (405 ml), water (132 ml), and methyl tributylammonium chloride (15 g) was heated to 80° C. for for 48 hours. To the reaction, four times was added sodium dithionite (15 g) and 50% caustic (30 g), the reaction was complete when the mixture turned purple. Upon completion of reaction the reaction mixture was quenched with 1400 ml of a 1:1 mixture of acetonitrile and water, followed by cooling to room temperature and further cooling with an ice bath for 5 hours. The product was collected by filtration and washed with hexane. The solid was slurried in hexane (400 ml), collected and dried to yield 55 g (45% yield) of the product.

Step 4. 3,10-di-t-butyl-7,14-(4-triethyl ammonium butyl) triphenodithiazine bis(tetrafluoroborate). A solution of 3,10-di-t-butyl-7-14-94-bromobutyl) triphenodithiazine (50 g) and triethyl amine (203 ml) in acetonitrile (641 ml) was heated to reflux for 24 hours. The reaction mixture was cooled to room temperature and the solid collected by filtration. The bromide salt of the desired product was converted to the tetrafluoroborate salt by dissolving the solid in acetonitrile (250 ml), water (200 ml), and 4 M solution of sodium tetrafluoroborate (156 ml). The solution was heated to 50° C. for 2 hours and then cooled to 5 C. The product was collected by filtration, washed with water, and subjected to a second anion metathesis procedure to yield 51 g (78% yield) of the product.

Example 3

3,10-di-t-butyl-6,13-dimethoxy-7,14-dimethyl triphenodithiazine

The product was synthesized over three steps as illustrated below:

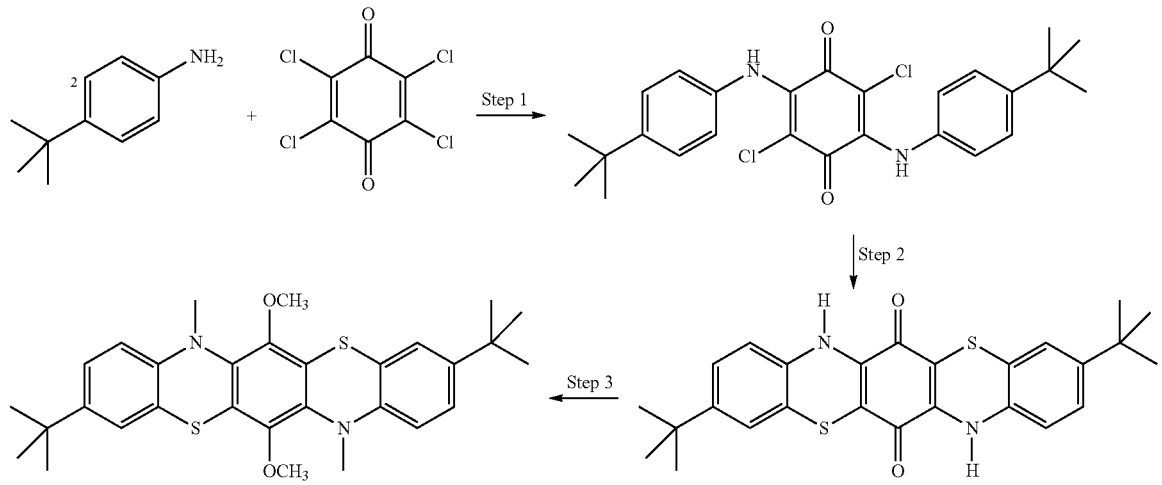

Step 1. To a one liter three neck round bottom flask was added tetrachloro-1,4-benzoquinone (16.45 g, 0.0669 mol), sodium acetate (15 g, 0.182 mol), and ethanol (350 ml). 4-t-butyl aniline (25 g, 0.1675 mol) dissolved in ethanol (150 ml) added slowly to the reaction mixture via an addition funnel. After the resultant exotherm subsided, the reaction was refluxed for 20 hours. After cooling to room temperature and quenching the reaction with water (350 ml), the product was filtered and washed with water, which after drying yielded 30 g (97% yield).

Step 2. To a one liter three neck round bottom flask was added the material from step 1 (30.6 g), sulfur (11 g), iodine (1.75 g), and dichlorobenzene (270 ml). The reaction was heated to 173° C. for 24 hours. The reaction was the cooled to room temperature, filtered and washed with hexane to give 18.7 g (62% yield) of the desired product.

Step 3. To a one liter three neck round bottom flask was added step 2 TPDTZ (5.0 g), sodium dithionite (8.0 g), sodium carbonate (10.0 g), methyl tributylammonium chloride (1.0 g), water (1 ml), acetonitrile (200 ml), and methyl iodide (20 ml). The reaction mixture was heated to reflux for 24 hours, followed by addition of a 50% sodium hydroxide solution (20 ml) and methyl iodide (50 ml), and continued refluxing for 72 hours. Additional 50% sodium hydroxide solution (20 ml) and methyl iodide (50 ml) was added to complete the reaction. After reaction was complete added water (400 ml) to quench the reaction. The reaction mixture was cooled to room temperature, filtered to obtain the solid and washed with water. Vacuum drying yielded the product (5.0 g, 96% yield).

Example 4

Synthesis of 2,3,4,6,9,10,11,13-octamethoxy-7-14-dimethyl triphenodithiazine

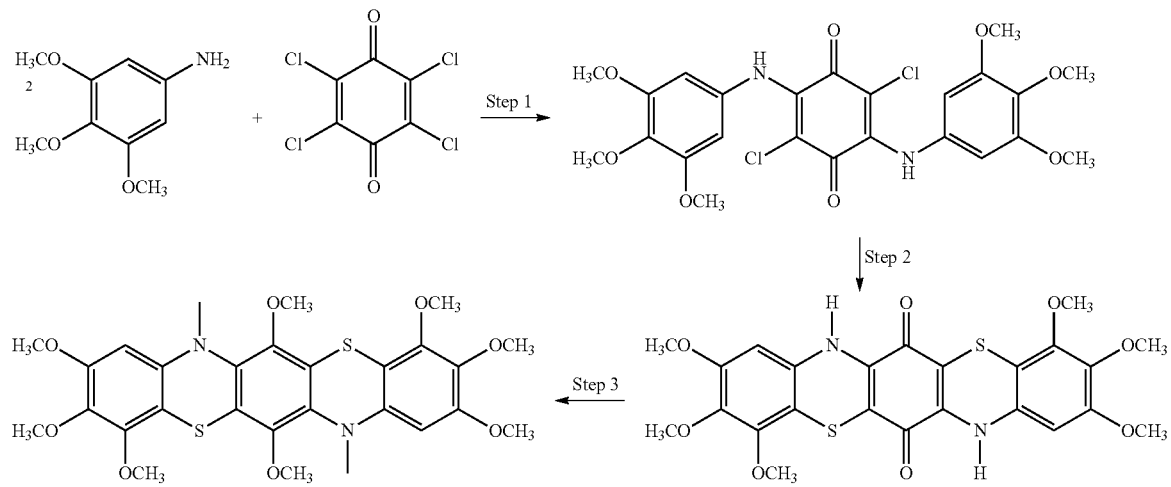

Step 1. To a one liter three neck round bottom flask was added tetrachloro-1,4-benzoquinone (24.59 g, 0.1 mol), sodium acetate (20.5 g, 0.25 mol), ethanol (400 ml), and 3,4,5-trimethoxy aniline (38.5 g, 0.21 mol). The reaction mixture was refluxed for 48 hours. Cooled to room temperature and quenched the reaction with water (700 ml). Product was filtered and washed with water. Vacuum drying of the product yielded 56.8 g (100% yield).

Step 2. To a one liter three neck round bottom flask was added the N,N'-bis(trimethoxyphenyl)-3,6-dichlorobenzoquinone from step 1 (26.9 g), sulfur (8.4 g), iodine (1.3 g), and dichlorobenzene (200 ml). The reaction was heated to reflux for 72 hours. The reaction was the cooled to room temperature, filtered and washed with hexane to give 27 g (100% yield) of the desired product.

Step 3. To a two liter three neck round bottom flask was added 2,3,4,9,10,11,-hexamethoxy-triphenodithiazine quinone (17.5 g, 0.033 mol), sodium dithionite (30.0 g), sodium carbonate (40 g), 50% sodium hydroxide solution (65 ml), methyl tributylammonium chloride (5 ml), water (5 ml), acetonitrile (200 ml), DMF (100 ml), and methyl iodide (100 ml). The reaction mixture was heated to reflux for 7 days. Periodically, additional sodium dithionite, 50% sodium hydroxide, and methyl iodide was added to complete the reaction. After reaction was complete added water (1000 ml) to quench the reaction. Reaction mixture was cooled to room temperature and filtered to obtain a solid that was washed with water. The product was recrystallized from THF and acetonitrile to give 3.6 g (18% yield).

Example 5

Synthesis of 3,6,10,13-tetramethoxy-7-14-dimethyl triphenodithiazine

Step 1. To a five liter three neck round bottom flask was added tetrachloro-1,4-benzoquinone (30 g, 0.122 mol), sodium acetate (36.9 g, 0.012 mol), and ethanol (1000 ml). p-Anisidine (37 g, 0.3 mol) was dissolved in ethanol (600 ml) and slowly added to the reaction mixture. The reaction mixture was refluxed for 48 hours, and then cooled to room temperature and quenched with water (1500 ml). The product was collected by filtration, washed with water, and vacuum dried to give the desired product (49 g, 40% yield)

Step 2. To a two liter three neck round bottom flask was added N,N'-bis(4-methoxyphenyl)-3,6-dichlorobenzoquinone (49 g, 0.116 mol), sulfur (18.6 g), iodine (2.7 g), and dichlorobenzene (700 ml). The reaction was heated to reflux for 72 hours. The reaction was cooled to room temperature and added 500 ml hexane. After filtering, the solid was washed with hexane to give 48.6 g (100% yield) of the desired product.

Step 2. To a one liter three neck round bottom flask was added 3,9,-dimethoxytriphenodithiazine quinone (13 g, 0.031 mol), sodium dithionite (20.0 g), sodium carbonate (25 g), methyl tributylammonium chloride (2 ml), water (2 ml), acetonitrile (200 ml), and methyl iodide (50 ml). The reaction mixture was heated to reflux for 72 hours. Periodically additional sodium dithionite, 50% sodium hydroxide (25 ml), and methyl iodide was added to complete the reaction. After reaction was complete added water (500 ml) to quench the reaction. Reaction mixture was cooled to room temperature. Filtered the gummy solid and washed with water. The solid was dissolved in hot THF and added ethanol. The product was isolated to give 3.37 g (21% yield).

Example 6

A Near-infrared (NIR) Isolated Electrode Filter Device

Figure 10:
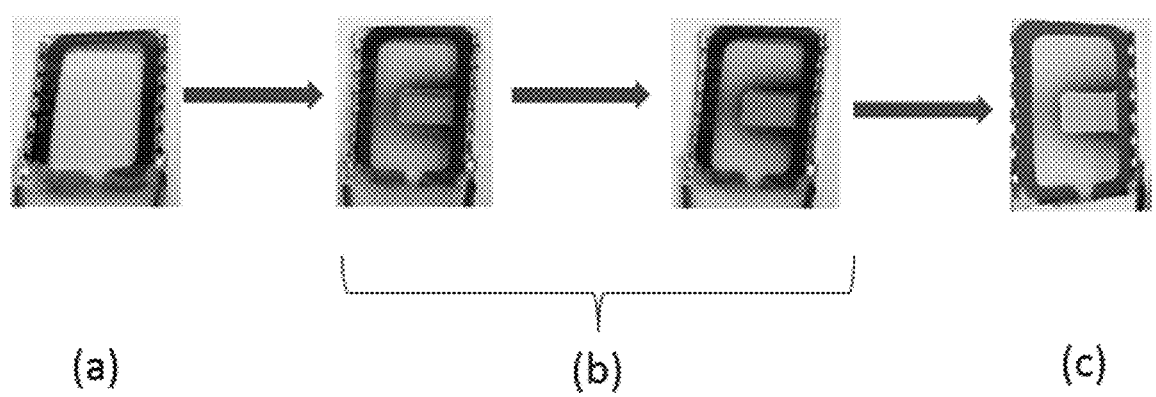
FIG. 10 depicts photographs of the near-infrared isolated electrode filter device of FIG. 9 in the unpowered state (a), powered at 1.4 volt during transition (b), and at the final state (c).

A non-limiting example of a NIR isolated electrode filter device, shown in FIG. 9 and FIG. 10, was filled with a solution of cathodic compound (15 mM of 1,1'-dioctyl-4,4'-bipyridinium bis (tetrafluoroborate)) and NIR absorber anodic compound (7 mM of 3,10-dimethoxy-7,14-(4-triethylammonium butyl) triphenodithiazine bis (tetrafluoroborate)), and LiBF$_4$ electrolyte (100 mM) in propylene carbonate. The device contained ITO-coated glass with laser

Figure 11:
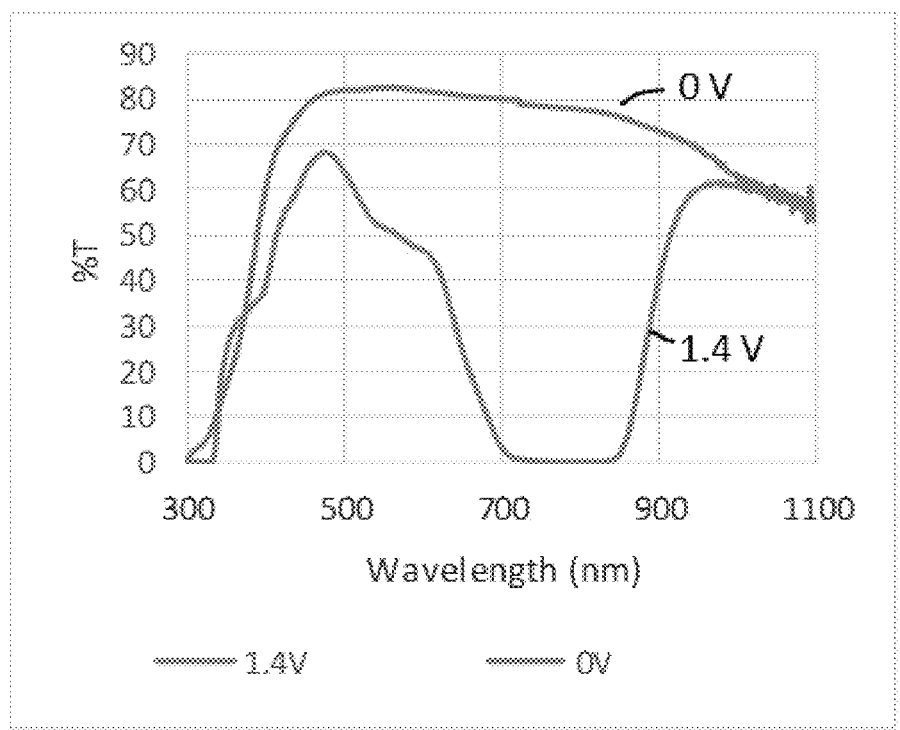
FIG. 11 depicts transmission spectral data for the near-infrared filter device of FIG. 9.
Figure 12:
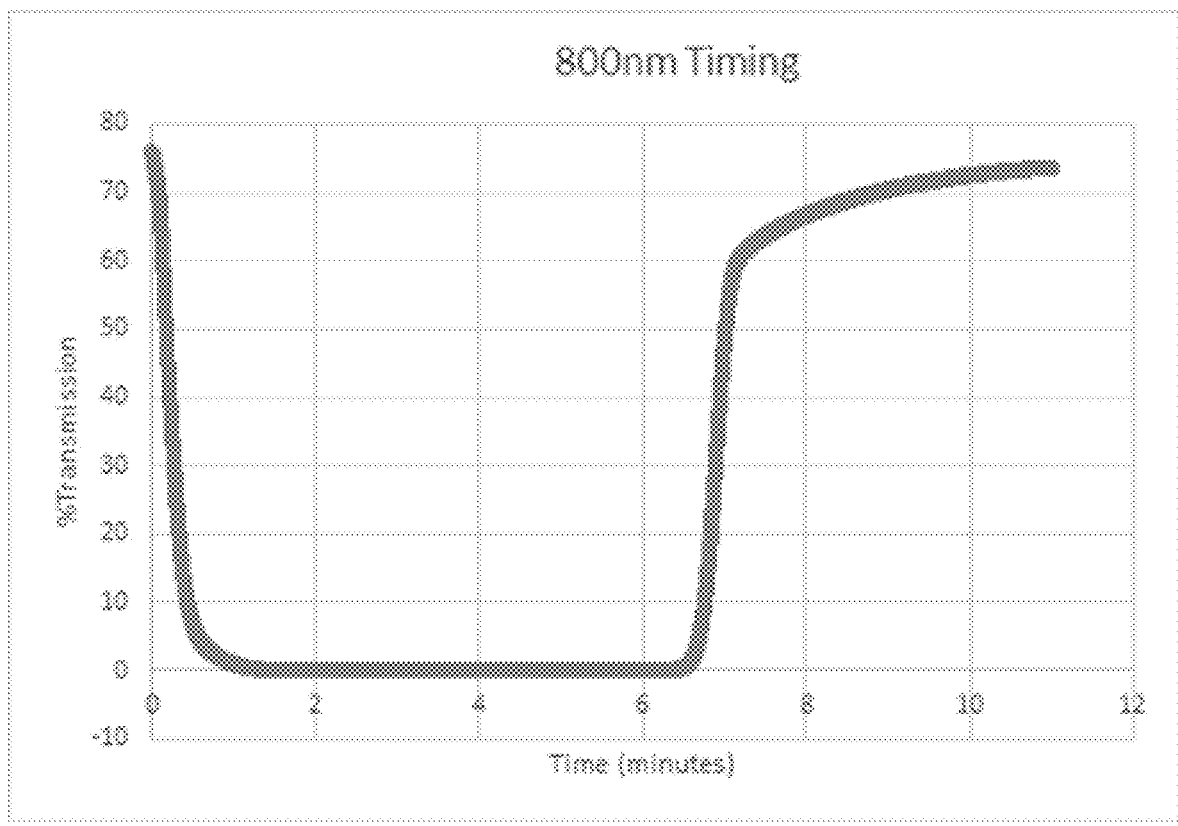
FIG. 12 depicts assessment of switching time by the near-infrared filter device of FIG. 9.

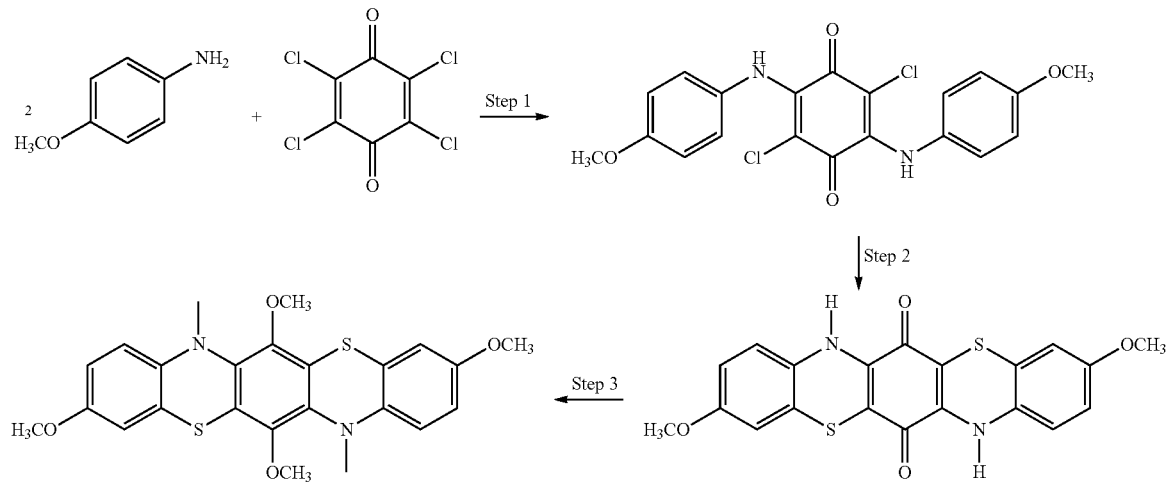

ablated isolation lines at surface 2 and surface 3, where the two active electrodes do not overlap significantly. Transmission spectral data and assessment of switching time for the device are shown in FIG. 11 and FIG. 12, respectively.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Para. A. An electrochromic device comprising a compound of Formula (I):

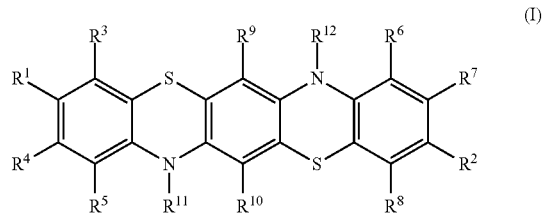

wherein:
$R^1$ and $R^2$ are individually alkyl, alkoxy, or aryloxy;
$R^3$, $R^4$, $R^5$, $R^6$, $R^7$, $R^8$ are individually H, alkoxy, or aryloxy;
$R^9$ and $R^{10}$ are individually alkoxy, or aryloxy, or where $R^1$ and $R^2$ are alkyl, $R^9$ and $R^{10}$ are individually H, alkoxy, or aryloxy;
$R^{11}$ and $R^{12}$ are individually alkyl or $-(CH_2)_n N^+(R^{20})^3$ [X], wherein n is from 1 to 20;
each $R^{20}$ is individually alkyl; and
X is an anion.

Para. B. The electrochromic device of Para. A, wherein $R^1$ and $R^2$ are individually $C_1$-$C_{12}$-alkoxy, a group of formula $R^{21}[O(CH_2)_x]_q O-$, or $C_6$-$C_{20}$-aryloxy, wherein $R^{21}$ is alkyl, x is 1, 2, 3, or 4, and q is an integer from 1 to 20.

Para. C. The electrochromic device of Para. A or Para. B, wherein $R^9$ and $R^{10}$ are both $C_1$-$C_{12}$-alkoxy, a group of formula $R^{21}[O(CH_2)_x]_q O-$, or $C_6$-$C_{20}$-aryloxy, wherein $R^{21}$ is alkyl, x is 1, 2, 3, or 4, and q is an integer from 1 to 20.

Para. D. The electrochromic device of Para. A, wherein:
$R^1$ and $R^2$ are individually alkyl;
$R^3$, $R^4$, $R^5$, $R^6$, $R^7$, $R^8$ are individually H;
$R^9$ and $R^{10}$ are individually H or alkoxy;
$R^{11}$ and $R^{12}$ are individually $C_1$-$C_{12}$-alkyl or $X^- (R^{20})_3 N^+ (CH_2)_n$ wherein n is from 1 to 10;
each $R^{20}$ is $C_1$-$C_6$-alkyl; and
X is an anion.

Para. E. The electrochromic device of Para. D, wherein:
$R^1$ and $R^2$ are individually $C_1$-$C_6$-alkyl;
$R^3$, $R^4$, $R^5$, $R^6$, $R^7$, $R^8$ are individually H;
$R^9$ and $R^{10}$ are individually H or $C_1$-$C_6$-alkoxy;
$R^{11}$ and $R^{12}$ are individually methyl, ethyl, n-propyl, iso-propyl, n-butyl, iso-butyl, sec-butyl, t-butyl, or $-(CH_2)_n N^-(R^{20})^3$ [X]$^-$ wherein n is from 1 to 6; each $R^{20}$ is methyl or ethyl; and
X is an anion.

Para. F. The electrochromic device of Para. A, wherein:
$R^1$ and $R^2$ are individually $C_1$-$C_{12}$-alkoxy;
$R^3$, $R^4$, $R^7$, $R^8$ are individually $C_1$-$C_{12}$-alkoxy;
$R^5$ and $R^6$ are H;
$R^9$ and $R^1$ are individually $C_1$-$C_{12}$-alkoxy;
$R^{11}$ and $R^{12}$ are individually $C_1$-$C_{12}$-alkyl or $-(CH_2)_n N^+ (R^{20})^3$ [X] wherein n is from 1 to 20;
each $R^{20}$ is individually $C_1$-$C_6$-alkyl; and
X is an anion.

Para. G. The electrochromic device of Para. A, wherein:
$R^1$ and $R^2$ are individually methoxy, ethoxyl, n-propoxy, iso-propoxy, n-butoxy, sec-butoxy, or t-butoxy;
$R^3$, $R^4$, $R^7$, $R^8$ are individually methoxy, ethoxyl, n-propoxy, iso-propoxy, n-butoxy, sec-butoxy, or t-butoxy;
$R^5$ and $R^6$ are H;
$R^9$ and $R^{10}$ are individually methoxy, ethoxyl, n-propoxy, iso-propoxy, n-butoxy, sec-butoxy, or t-butoxy;

$R^{11}$ and $R^{12}$ are individually methyl, ethyl, n-propyl, iso-propyl, n-butyl, iso-butyl, sec-butyl, t-butyl, or —$(CH_2)_nN^-(R^{20})^3$ [X] wherein n is from 1 to 6;

each $R^{20}$ is individually methyl, ethyl, n-propyl, iso-propyl, n-butyl, iso-butyl, sec-butyl, t-butyl; and X is an anion.

Para. H. The electrochromic device of Para. A, wherein X is $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)_2^-$, $^-Al(OC(CF_3)_3)_4$ or $^-BAr_4$, wherein Ar is a aryl or fluorinated aryl group.

Para. I. The electrochromic device of any one of Paras. A-H further comprising an electrochromic medium comprising an anodic material comprising the compound of Formula (I).

Para. J. The electrochromic device of Para. I, wherein the electrochromic medium further comprises a solvent.

Para. K. The electrochromic device of any one of Paras. A-J further comprising a cathodic material.

Para. L. The electrochromic device of Para. K, wherein the electrochromic medium further comprises the cathodic material.

Para. M. The electrochromic device of Para. A, wherein the compound of Formula (I) is 3,10-di-t-butyl-7,14-bis(4-triethylammoniumbutyl) triphenodithiazine bis(tetrafluoroborate); 3,10-di-t-butyl-6,13-dimethoxy-7,14-dimethyl triphenodithiazine; 2,3,4,6,9,10,11,13-octamethoxy-7-14-dimethyl triphenodithiazine; 3,6,10,13-tetramethoxy-7-14-dimethyl triphenodithiazine, or a mixture of any two or more thereof.

Para. N. The electrochromic device of Para. A which is a mirror, an architectural window, an aircraft window, a filter, or a battery.

Para. O. A compound of Formula (I):

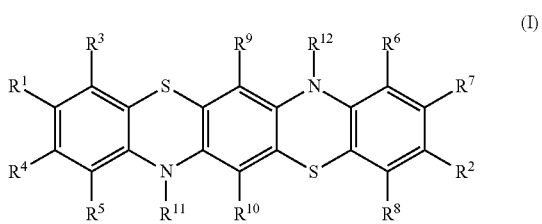

(I)

wherein:
$R^1$ and $R^2$ are individually alkyl, alkoxy, or aryloxy;
$R^3$, $R^4$, $R^5$, $R^6$, $R^7$, $R^8$ are individually H, alkoxy, or aryloxy;
$R^9$ and $R^{10}$ are individually alkoxy, or aryloxy, or where $R^1$ and $R^2$ are alkyl, $R^9$ and $R^{10}$ are individually H, alkoxy, or aryloxy;
$R^{11}$ and $R^{12}$ are individually alkyl or —$(CH_2)_nN^+(R^{20})^3$ [X]$^-$ wherein n is from 1 to 20;
each $R^{20}$ is individually alkyl; and
X is an anion.

Para. P. The compound of Para. O, wherein:
$R^1$ and $R^2$ are individually alkyl;
$R^3$, $R^4$, $R^5$, $R^6$, $R^7$, $R^8$ are individually H;
$R^9$ and $R^{10}$ are individually H or alkoxy;
$R^{11}$ and $R^{12}$ are individually $C_1$-$C_{12}$-alkyl or —$(CH_2)_nN^+(R^{20})^3$ [X]$^-$ wherein n is from 1 to 10;
each $R^{20}$ is individually $C_1$-$C_6$-alkyl; and
X is an anion.

Para. Q. The compound of Para. P, wherein:
$R^1$ and $R^2$ are individually $C_1$-$C_6$-alkyl;
$R^3$, $R^4$, $R^5$, $R^6$, $R^7$, $R^8$ are individually H;

$R^9$ and $R^{10}$ are individually H or $C_1$-$C_6$-alkoxy;
$R^{11}$ and $R^{12}$ are individually methyl, ethyl, n-propyl, iso-propyl, n-butyl, iso-butyl, sec-butyl, t-butyl, or —$(CH_2)_nN^+(R^{20})^3$ [X]$^-$ wherein n is from 1 to 6;
each $R^{20}$ is methyl or ethyl; and
X is an anion.

Para. R. The compound of Para. O, wherein:
$R^1$ and $R^2$ are individually $C_1$-$C_{12}$-alkoxy;
$R^3$, $R^4$, $R^7$, $R^8$ are individually $C_1$-$C_{12}$-alkoxy;
$R^5$ and $R^6$ are H;
$R^9$ and $R^{10}$ are individually $C_1$-$C_{12}$-alkoxy;
$R^{11}$ and $R^{12}$ are individually $C_1$-$C_{12}$-alkyl or —$(CH_2)_nN^+(R^{20})^3$ [X]$^-$ wherein n is from 1 to 20;
each $R^{20}$ is individually $C_1$-$C_6$-alkyl; and
X is an anion.

Para. S. The compound of Para. O, wherein X is $F_-$, $Cl_-$, $Br_-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)_2^-$, $^-Al(OC(CF_3)_3)_4$ or $^-BAr_4$, wherein Ar is a aryl or fluorinated aryl group.

Para. T. The compound of Para. O which is 3,10-di-t-butyl-7,14-bis(4-triethylammoniumbutyl) triphenodithiazine bis(tetrafluoroborate); 3,10-di-t-butyl-6,13-dimethoxy-7,14-dimethyl triphenodithiazine; 2,3,4,6,9,10,11,13-octamethoxy-7-14-dimethyl triphenodithiazine; or 3,6,10,13-tetramethoxy-7-14-dimethyl triphenodithiazine.

Para. U. An electrochromic device comprising an anodic compound, wherein under an applied voltage of sufficient magnitude, the anodic compound is oxidized to a stable third oxidation state.

Para. V. The electrochromic device of Para. U, wherein the anodic compound is a compound of Formula (I):

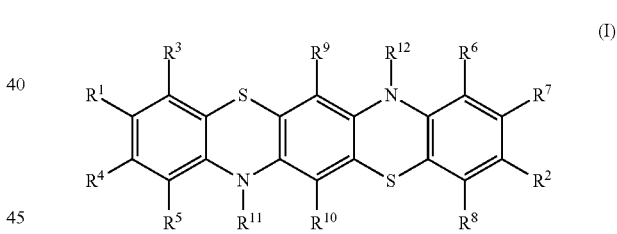

(I)

wherein:
$R^1$ and $R^2$ are individually alkyl, alkoxy, or aryloxy;
$R^3$, $R^4$, $R^5$, $R^6$, $R^7$, $R^8$ are individually H, alkoxy, or aryloxy;
$R^9$ and $R^{10}$ are individually alkoxy, or aryloxy, or where $R^1$ and $R^2$ are alkyl, $R^9$ and $R^{10}$ are individually H, alkoxy, or aryloxy;
$R^{11}$ and $R^{12}$ are individually alkyl or —$(CH_2)_nN^+(R^{20})^3$ [X]$^-$ wherein n is from 1 to 20;
each $R^{20}$ is individually alkyl; and
X is an anion.

Para. W. The electrochromic device of Para. U, which is a mirror, an architectural window, an aircraft window, a filter, or a battery.

Other embodiments are set forth in the following claims.

What is claimed is:

1. An electrochromic device comprising a compound of Formula (I):

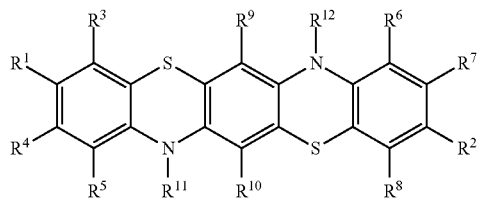

(I)

wherein:
R¹ and R² are individually, alkoxy, or aryloxy;
R³, R⁴, R⁵, R⁶, R⁷, R⁹ are individually H, alkoxy, or aryloxy;
R⁹ and R¹⁰ are both $C_1$-$C_{12}$-alkoxy, a group of formula $R^{21}[O(CH_2)_x]_qO-$, or $C_6$-$C_{20}$-aryloxy, wherein $R^{21}$ is alkyl, x is 1, 2, 3, or 4, and q is an integer from 1 to 20;
R¹¹ and R¹² are individually alkyl; and
X is an anion.

2. The electrochromic device of claim 1, wherein R¹ and R² are individually $C_1$-$C_{12}$-alkoxy, a group of formula $R^{21}[O(CH_2)_x]_qO-$, or $C_6$-$C_{20}$-aryloxy, wherein $R^{21}$ is alkyl, x is 1, 2, 3, or 4, and q is an integer from 1 to 20.

3. The electrochromic device of claim 1, wherein:
R¹ and R² are individually $C_1$-$C_{12}$-alkoxy;
R³, R⁴, R⁷, R⁸ are individually $C_1$-$C_{12}$-alkoxy;
R⁵ and R⁶ are H;
R⁹ and R¹⁰ are individually $C_1$-$C_{12}$-alkoxy;
R¹¹ and R¹² are individually $C_1$-$C_{12}$-alkyl; and
X is an anion.

4. The electrochromic device of claim 1, wherein:
R¹ and R² are individually methoxy, ethoxyl, n-propoxy, iso-propoxy, n-butoxy, sec-butoxy, or t-butoxy;
R³, R⁴, R⁷, R⁸ are individually methoxy, ethoxyl, n-propoxy, iso-propoxy, n-butoxy, sec-butoxy, or t-butoxy;
R⁵ and R⁶ are H;
R⁹ and R¹⁰ are individually methoxy, ethoxyl, n-propoxy, iso-propoxy, n-butoxy, sec-butoxy, or t-butoxy;
R¹¹ and R¹² are individually methyl, ethyl, n-propyl, iso-propyl, n-butyl, iso-butyl, sec-butyl, or t-butyl; and
X is an anion.

5. The electrochromic device of claim 1 further comprising an electrochromic medium comprising an anodic material comprising the compound of Formula (I).

6. The electrochromic device of claim 1, wherein the compound of Formula (I) is 2,3,4,6,9,10,11,13-octamethoxy-7-14-dimethyl triphenodithiazine; 3,6,10,13-tetramethoxy-7-14-dimethyl triphenodithiazine, or a mixture of any two or more thereof.

7. The electrochromic device of claim 1 which is a mirror, an architectural window, an aircraft window, a filter, or a battery.

* * * * *